US007577139B2

(12) United States Patent
Overgaard

(10) Patent No.: US 7,577,139 B2
(45) Date of Patent: Aug. 18, 2009

(54) DISAGGREGATED STAR PLATFORM MANAGEMENT BUS ARCHITECTURE SYSTEM

(75) Inventor: Mark D. Overgaard, Scotts Valley, CA (US)

(73) Assignee: Pigeon Point Systems, Scotts Valley, CA (US)

( * ) Notice: Subject to any disclaimer, the term of this patent is extended or adjusted under 35 U.S.C. 154(b) by 91 days.

(21) Appl. No.: 11/502,324

(22) Filed: Aug. 9, 2006

(65) Prior Publication Data
US 2006/0280196 A1 Dec. 14, 2006

Related U.S. Application Data

(63) Continuation-in-part of application No. 10/999,812, filed on Nov. 29, 2004, now abandoned.

(51) Int. Cl.
*H04L 12/28* (2006.01)
(52) U.S. Cl. .................. 370/389; 370/395.31; 370/256; 370/257; 370/258
(58) Field of Classification Search ......... 370/216–228, 370/237, 240, 254–258, 289, 299, 360, 385, 370/386, 395.31, 400, 401, 402, 407, 422, 370/423, 424, 425, 389, 392, 393, 396, 397, 370/398, 399, 395.2, 395.3, 395.53, 409, 370/431
See application file for complete search history.

(56) References Cited

U.S. PATENT DOCUMENTS

| | | | |
|---|---|---|---|
| 6,101,181 A * | 8/2000 | Passint et al. ................ 370/352 |
| 6,675,268 B1 | 1/2004 | DeKoning et al. | |
| 6,724,757 B1 * | 4/2004 | Zadikian et al. ............. 370/388 |
| 6,925,540 B2 | 8/2005 | Hawkins | |
| 6,948,008 B2 | 9/2005 | Hawkins et al. | |
| 7,012,917 B2 * | 3/2006 | Brolin et al. ................. 370/352 |
| 7,027,413 B2 * | 4/2006 | Lee et al. ..................... 370/255 |
| 7,058,703 B2 | 6/2006 | Hawkins et al. | |
| 7,065,078 B2 * | 6/2006 | Hawkins et al. ............. 370/389 |
| 7,159,062 B2 | 1/2007 | Byers et al. | |
| 7,187,679 B2 * | 3/2007 | Dally et al. .................. 370/400 |

(Continued)

FOREIGN PATENT DOCUMENTS

WO WO 2006/058288 A3 6/2006

OTHER PUBLICATIONS

PICMG 3.0 Short Form Specification, Jan. 2003, PICMG.*

(Continued)

*Primary Examiner*—Wing F. Chan
*Assistant Examiner*—Mark A. Mais
(74) *Attorney, Agent, or Firm*—Lewis and Roca LLP

(57) ABSTRACT

A star topology platform management bus architecture and system that provides disaggregation of the platform control element portion and the routing element portion of a central management controller, which provides for physical design efficiency as well as other advantages. Such disaggregation is particularly beneficial in the context of modular electronic platforms that are standardized, since standardized boards are often highly constrained in the available backplane connection pins. The platform control element can be implemented on a standardized board and use a small number of pins to communicate via the backplane with a non-standardized board that implements one or more routing elements, which themselves require a large number of pins to communicate with various satellite management controllers.

30 Claims, 12 Drawing Sheets

U.S. PATENT DOCUMENTS

| | | | |
|---|---|---|---|
| 7,340,538 B2 * | 3/2008 | Alappat et al. | 710/5 |
| 2002/0097745 A1 * | 7/2002 | Brolin et al. | 370/466 |
| 2002/0144086 A1 | 10/2002 | Tanaka et al. | |
| 2003/0130969 A1 | 7/2003 | Hawkins et al. | |
| 2003/0152074 A1 | 8/2003 | Hawkins et al. | |
| 2003/0188051 A1 | 10/2003 | Hawkins et al. | |
| 2004/0083356 A1 | 4/2004 | Chatterjee et al. | |
| 2004/0095881 A1 | 5/2004 | Borella et al. | |
| 2005/0160187 A1 | 7/2005 | Byers et al. | |

OTHER PUBLICATIONS

Complete System Redundancy; 2003; Moxa Networking Co. LTD.*
ATCA—The NexGen Telecom Standard; Summer 2004; Nuvation Research Corporation.*
Elma Talk; Jun. 2002, Issue 2; Elma Electronics Group.*
PICMG 3.2 Advanced Telecommunications and Computing Architecture; Mellanox Technologies.*
Basic Questions for a PICMG 3.x backplane; Elma Electronics Group.*
Kaparel/Rittal Announces ATCA Shelf; 2003; Kaparel Corporation.*
PICMG Specifications Index; Revision 2.7, Apr. 24, 2006; PICMG.*
Designing Electronic Enclosures: A Balancing Act; Elma Electronics Group.*
Hua; Building Advanced Switching Backbones: ATCA Hardware Issues; Jul. 21, 2004; CommsDesign.*
AdvancedTCA* Modular Communications Platform Design Guide, Guidelines for Modular Communications Platform Building-Block and System Interoperability, Version 2.0 Release 1.0, Oct. 29, 2004, pp. 1-188.
Notification and Transmittal of International Search Report published Sep. 29, 2006 in corresponding International Patent Application No. PCT/US2005/042908 filed Nov. 28, 2005, 15 pages.
Notification and Transmittal of International Preliminary Report on Patentability dated Mar. 26, 2007 in corresponding International Patent Application No. PCT/US2005/042908 filed Nov. 28, 2005, 9 pages.
"Q and A for Intel's CompactPCI Building Block Components Based on the PICMG 2.16 Packet Switched Backplane Specification," Oct. 2001, pp. 4-5 relevant (10 page document), Intel Corporation, Santa Clara, CA, USA.
"NonStop™ Cyclone System Description Manual," First Edition, Part No. 17223, Nov. 1989, p. 1-26 and Figure 1-29 on p. 1-30 relevant (14 pages submitted), Tandem Computers, Inc., USA.
"Intel® NetStructure™ ZT 7101 Chassis Management Module," Technical Product Specification, Revision Mar. 20, 2002, pp. 13 and 45 relevant (54 page document), Intel Corporation, Hillsboro, OR, USA.
"Proposal for RASM sub team consideration," PICMG, copyright 2001, p. 3 relevant (10 page document), Intel Corporation, Santa Clara, CA, USA.
"IPM Sentry™ Shelf Management Starter Kit: ShMM-300 Edition," Pigeon Point Systems Product Brief, copyright 2004, 2 pages, Pigeon Point Systems, Scotts Valley, CA, USA.
"IPM Sentry™ ShMM-300 and Shelf Manager, Shelf Management Mezzanine: Shelf Manager Core for AdvancedTCA®," Pigeon Point Systems Product Brief, copyright 2004, 4 pages, Pigeon Point Systems, Scotts Valley, CA, USA.
"IPM Sentry™ Board Management Starter Kit: BMR-AVR-ATCA Edition," Pigeon Point Systems Product Brief, copyright 2004, 2 pages, Pigeon Point Systems, Scotts Valley, CA, USA.
"IPM Sentry™ ATCA Management Exerciser Board", Pigeon Point Systems Product Brief, copyright 2004, 2 pages, Pigeon Point Systems, Scotts Valley, CA, USA.
"IPMI - Intelligent Platform Management Bus Communications Protocol Specification v1.0," Document Revision 1.0, Nov. 15, 1999, Intel, Hewlett-Packard, NEC, Dell, 40 pages.
"AdvancedTCA* Management Topologies," Intel Developer Forum, 1 page, Intel Corporation, Santa Clara, CA, USA.
Byers, Chuck, Bell Labs Fellow, "From Standards to Platforms to Products to Profits," Bus and Board Conference, Jan. 2003, Lucent Technologies, 18 pages.
Renehan, Jim, "New PICMG specifications expand PCI Express usage in embedded systems," CompactPCI and AdvancedTCA Systems, Dec. 2004, 3 pages.
"ATCA Dual Star Backplanes," Rev. B, 5 pages, Bustronic, Fremont, CA, USA.
"AdvancedTCA Backplane," 8 pages, Bustronic, Fremont, CA, USA.
"IPM Sentry™ BMR-AVR-ATCA: IPM Sentry Board Management Reference Design for Advanced TCA®" Pigeon Point Systems Product Brief, copyright 2004, 3 pages, Pigeon Point Systems, Scotts Valley, CA, USA.

* cited by examiner

DISAGGREGATED STAR PLATFORM MANAGEMENT BUS ARCHITECTURE SYSTEM

CROSS REFERENCE TO OTHER APPLICATIONS

This application is a continuation-in-part of U.S. Ser. No. 10/999,812, filed Nov. 29, 2004, now abandoned, the contents of which are incorporated by reference in their entirety.

BACKGROUND

The present invention relates generally to the field of platform management systems, and more specifically to a disaggregated star platform management bus architecture.

DESCRIPTION OF RELATED ART

Computers and other electronic systems often include features with the ability to monitor and control the health and operation of the system hardware. These features may be referred to as platform management, system management, hardware management, etc. Platform management features may include the monitoring and control of temperatures, voltages, fans, power supplies, and other features. Platform management may also include the identification of failed hardware components.

One widely used framework for platform management is the Intelligent Platform Management Interface (IPMI), which specifies key agents involved as well as command sets and data formats for sensors, event logs and sensor data record access, as well as inventory information regarding the Field Replaceable Units (FRUs) that comprise a system.

A platform management system is typically composed of hardware, firmware, and software embedded within an electronic system for the purpose of monitoring and control of the system's operation. This management is typically performed independently of the main processor(s) and operating system of the system. One of the components that may be used to control platform management functions is a central management controller. A central management controller may be based on a microprocessor, application specific integrated circuit, or other type of processing unit and is the principal platform management entity in a system. (In IPMI, the central management controller is referred to as the baseboard management controller.) The central management controller may work with satellite management controllers in the system, some of them integrated on independent FRUs. When an FRU incorporates a satellite management controller, it is referred to as an intelligent FRU. The central management controller can monitor a myriad of operational aspects affecting or detailing the health of the system through any one or more of the satellite management controllers. Typically, each of the intelligent FRUs, including front boards, in a chassis or shelf has a satellite management controller, each of which is in communication with sensors and other components used to monitor and control devices on that FRU or on other FRUs it represents. Another typical responsibility of a central management controller is to represent the chassis or shelf and its constituent FRUs to higher level management entities, often via a network (perhaps Ethernet) link. "Shelf" is often used in the telecommunications industry instead of the more familiar term "chassis".

Typical, prior art platform management control applications utilize a single physical bus—Intelligent Platform Management Bus (IPMB) in IPMI contexts—to link the central management controller with any satellite management controllers in the system. In such single bus systems, all of the communications sent to any of the satellite management controllers are sent to all controllers that are communicatively linked to the physical bus. An advantage of a single physical bus is economy; with only one physical bus, one does not need to route isolated communication lines to each of satellite management controllers but can instead utilize common communication lines with shared access by all management controllers.

In United States patent U.S. Pat. No. 7,065,078 B2, to Hawkins et al., entitled "Switched Platform Management Architecture and Related Methods", and US Patent Application Publication 2003/0130969 A1, to Hawkins et al., entitled "Star Intelligent Platform Management Bus Topology", a star topology with multiple logical buses is introduced. This approach utilizes physically disparate interconnect segments to each set of one or more satellite management controllers such that each set is communicatively isolated from the other sets. Although the Hawkins et al. approach provides some fault tolerance and other benefits, the star topology has a distinct disadvantage of requiring the routing of many wires, which comprise the multiple logical buses, from the board upon which the central management controller is located. This disadvantage can be especially important in the context of standardized modular platforms, where most of the pins available on a board may be allocated to specific purposes and insufficient in number to handle that many signals. There is thus a need for a new approach that will obviate the disadvantages with the multiple wire routing problems.

BRIEF SUMMARY

Briefly, a presently preferred embodiment of the present invention includes a star topology platform management bus architecture and system and that provides disaggregation of the platform control element portion and the routing element portion of a central management controller. Such disaggregation permits use of existing standardized shelf design and connector technology to accommodate electrical connection between the central management controller and the routing element, and to use the backplane and other boards and connectors to accommodate the bus connections between one or more routing elements and various satellite management controllers. The present invention provides for physical design efficiency as well as other advantages.

DETAILED DESCRIPTION

Figure 1:
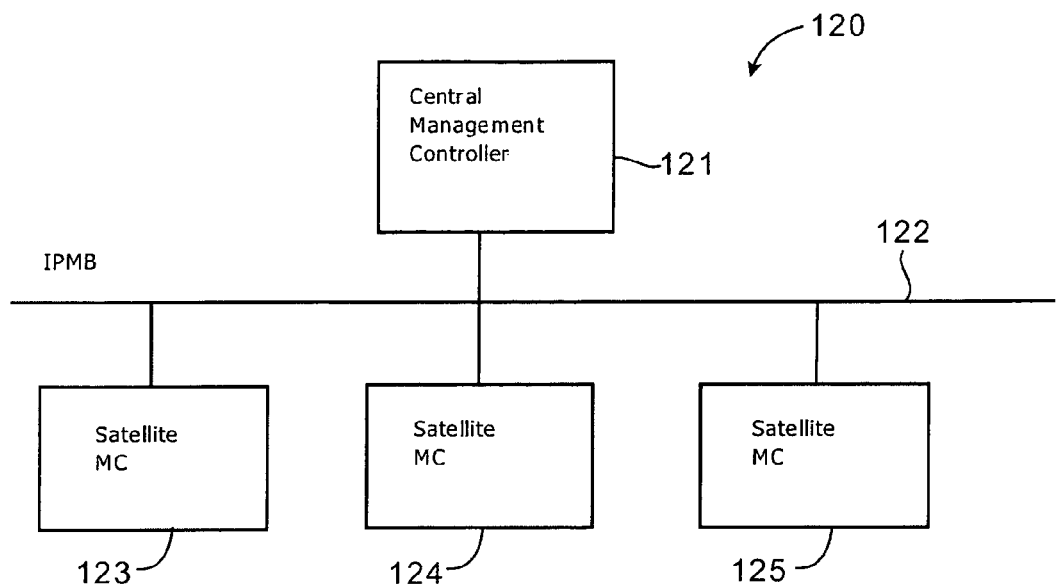
FIG. 1 is a block diagram of a conventional or prior art intelligent platform management bus (IPMB) architecture.

FIG. 1 illustrates at 120 an example of a conventional, or prior art, IPMB architecture. IPMB (current version 1.0, revision 1.0, Nov. 15, 1999, published by Intel Corporation, Hewlett-Packard Corporation, NEC Corporation, and Dell Computer Corporation) is the main means for in-system platform management information exchange among management controllers in the IPMI architecture. The current versions of the IPMI specification are 1) version 1.5, revision 1.1, Feb. 20, 2002 and 2) version 2.0, revision 1.0, Feb. 12, 2004; both are published by Intel Corporation, Hewlett-Packard Corporation, NEC Corporation, and Dell Computer Corporation. In this example, a central management controller (central MC) 121 is communicatively linked to a plurality of satellite management controllers (satellite MCs) 123, 124, 125 via a single intelligent platform management bus (IPMB) 122. Although three satellite control elements are illustrated here, it is understood that any number of such satellite management controllers may be present utilizing this architecture. The IPMB 122 is typically an addressable serial bus. In the conventional IPMI architecture, a single physical bus is used. With such a single physical bus approach, a single logical bus can be used, as well. The IPMB 122 is used to communicate with all of the satellite MCs 123, 124, 125 and thus each of the satellite MCs receives all of the communications directed to any of the satellite MCs.

A platform management system may perform tasks such as sending and receiving platform management information, controlling platform management functions, and recording platform management information. For example, a platform management system may receive and log an indication from a temperature sensor that it is sensing a temperature above a configured threshold, and in response, may send a command to increase fan speed.

One of the controllers in a system may perform the role of the central management controller for the system, in which case it may perform central system management functions such as logging events, collecting field replaceable unit (FRU) inventory information, etc. In addition to these system-internal responsibilities, a central management controller may be responsible to represent the system to higher level management entities, typically via a network link. In conventional IPMI terminology, the central management controller for a system is usually referred to as the baseboard management controller (BMC) for the system. In the modular platform architectures according to some embodiments of the present invention, "central" is a more appropriate adjective because there may be no single "baseboard" as might be present in a conventional server. In some embodiments, redundancies are built into the system resulting in more than one CMC in a system. It is common for a system to have only one active central management controller. Non-central management controllers may be referenced as satellite management controllers (SMCs). An SMC may perform platform management for a particular part or feature of a system. For example, a system may contain a number of circuit boards and other components that are connected by buses, with one board containing a central management controller for that system and other boards containing SMCs. SMCs are typically resident on FRUs, which include front boards and other types of components.

In the IPMI-based IPMB configuration 120 the central MC 121 typically monitors a variety of management functions for the electronic platform in which it resides. The satellite MCs 123, 124, 125 may reside on different boards within an electronic chassis. Each satellite MC may itself provide communication links to various control and monitoring devices for the board on which it resides.

Figure 2:
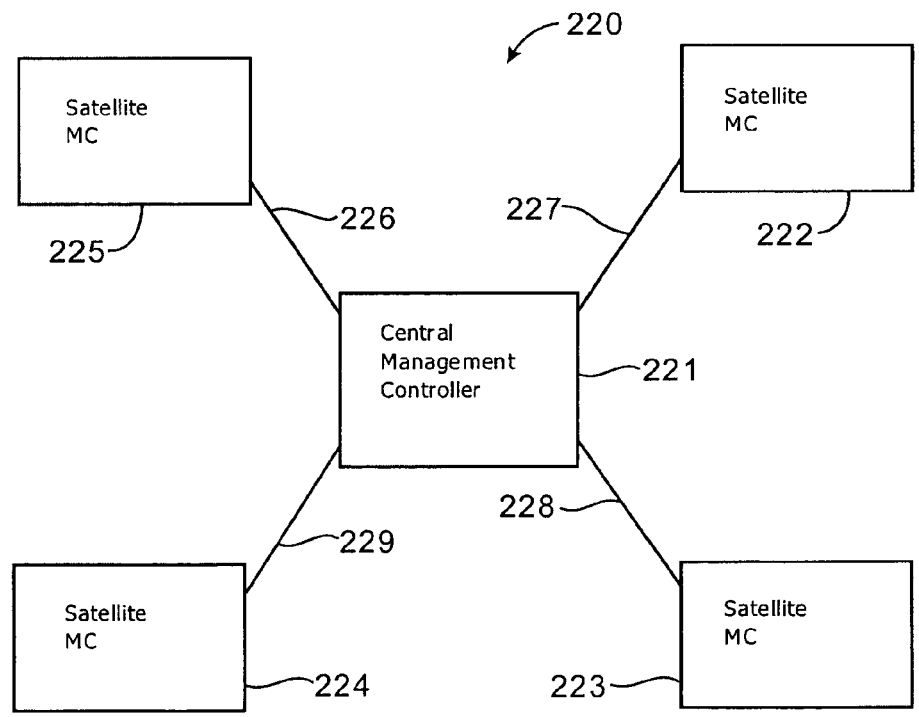
FIG. 2 is a block diagram illustrating a prior art star intelligent platform management bus (IPMB) architecture.

FIG. 2 illustrates at 220, an example of a star intelligent platform management bus (IPMB) architecture. Instead of a single physical IPMB communicatively linking the central MC to all of the satellite MCs, each of the satellite MCs 222, 223, 224, 225, has an independent physical bus segment 226, 227, 228, 229 which communicatively links it to the central MC 221. The independent physical nature of these bus segments allows for fault isolation. The independent physical bus architecture allows any one of the independent physical bus segments 226, 227, 228, 229 to be operated as an independent logical bus. Embodiments utilizing an independent logical bus architecture allow various features in addition to fault isolation. For instance, message content on one logical bus can be isolated from message content on another logical bus, thus enhancing security. This may be important if intelligent FRUs on different logical buses have different owners. Nevertheless, the combination of the logical buses can be operated conceptually as a single architectural bus that plays the same architectural role for platform management as the single physical IPMB 122 of FIG. 1.

Figure 3:
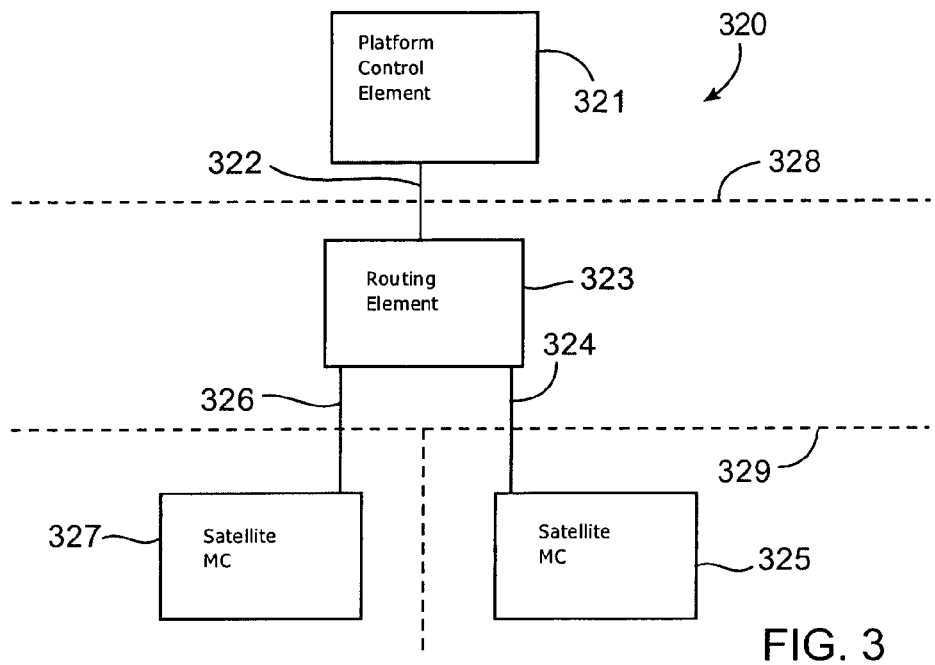
FIG. 3 is a simplified block diagram illustrating a disaggregated star platform management bus system in accordance with the present invention.

In FIG. 3, a platform management system 320 is depicted which includes a platform control element 321 that is communicatively linked with a routing element 323 via a root segment 322. In accordance with the present invention the platform control element 321 is disaggregated (i.e., physically separated) from the routing element 323 by positioning it on a separate FRU or other board. The demarcation line 328 illustrates the disaggregation of the platform control element 321 and the routing element 323. The platform control element 321 resides upon a field replaceable unit (FRU) in some embodiments. The FRU upon which the platform control element resides is preferably a front board. In accordance with the present invention the routing element 323 resides off of the FRU upon which the platform control element 321 resides and the two are communicatively coupled together by a root segment 322 that is implemented by a small number of wires, often two or four of them. The routing element 323 is communicatively linked to satellite MCs 325, 327 via branch segments 324, 326. There may be any number of satellite MCs included in this embodiment. The demarcation line 329 illustrates that the satellite MCs reside on other FRUs, such as front boards, for example.

For the purposes of this application, disaggregation means separating a platform control element from a routing element in a star platform management bus architecture so that the platform control element is not burdened by numerous connections to the branch segments of the star; the branch segments instead emanate from the routing element.

In its preferred form, the platform management system 320 resides within an electronic platform compliant to one or more open architectures for modular platforms, such as those developed by the PCI Industrial Computer Manufacturers Group (PICMG).

One such open modular architecture is PICMG 3.0, the Advanced Telecommunications Computing Architecture (AdvancedTCA or ATCA) specification, revision 2.0, as approved on Mar. 18, 2005, and amended by Engineering Change Notices 3.0-2.0-001 (Jun. 15, 2005) and 3.0-2.0-002 (May 5, 2006). The basic elements of a PICMG 3.0 platform are front boards, rear transition modules (RTMs), the backplane, and the subrack, along with other shelf-specific FRUs, such as fan trays or power entry modules. On the front board, three connector zones are defined: Zone 1 for power and shelf management connections; Zone 2 for data transport interface; and Zone 3 for user-defined Input/Output (I/O) interconnect. Front boards plug into slots on the backplane that contain corresponding connectors in at least Zone 1 and Zone 2. The subrack provides standardized mechanical support elements for the slots, such as guide rails and alignment pins.

The Zone 1 and Zone 2 connectors have very few pin positions that are not committed to existing specification-defined uses. In particular, Zone 1 connectors have four reserved pin positions (that are typically not even populated in current products) and the Zone 2 connectors have no uncommitted pin positions. Therefore, a front board containing the routing element for a star platform management bus architecture, with its numerous branch segment connections, would have to use Zone 3 connector(s) to attach to the backplane, thereby making it inherently shelf-dependent and not broadly compatible with a wide range of ATCA compliant shelves.

One of the options for routing root segment 322 is through a constrained Zone 2 connector in ATCA that is available for hub or switch boards for the base interface in a dual star gigabit-capable Ethernet fabric. A base interface hub board installs into one of two special redundant slots in the backplane and provides a star Ethernet fabric (optionally with a redundant peer in the second such slot) to front boards in the shelf. The defined base interface hub slot definition provides a shelf management controller port comprising eight pin positions. The expected use of this port is to allow one or two central management controller(s) (or shelf manager(s)) located outside of the subrack to communicate with the base interface fabric. If the platform control element 321 of a central management controller is implemented on each hub board, in accordance with the present invention, these pins become available for a root segment 322 link to a routing element 323 implemented outside the subrack, perhaps in an air plenum or other shelf-specific location.

In the absence of the present invention, the AdvancedTCA industry has assumed that central management controllers that support a star intelligent platform management bus cannot be implemented on the front boards of standardized modular platforms such as AdvancedTCA. For instance, the AdvancedTCA Modular Communications Platform Design Guide (Version 2.0 Release 1.0, Oct. 29, 2004, published by Intel Corporation and jointly copyrighted with 20 other AdvancedTCA industry participant companies) states that limitation in its discussion of implementation alternatives for intelligent platform management buses, by asserting that a non-dedicated shelf manager (in the terms of this application, a central management controller implemented on a front board) cannot support a radial IPMB-0 implementation (a star topology IPMB-0 in the terms of this application).

Another open modular architecture is defined by PICMG 2.5x, the Compact Telecommunications Computing Architecture (CompactTCA or cTCA) specification, currently in development and available in draft form as revision 0.83, dated Mar. 6, 2005. PICMG 2.5x platforms have the same basic elements as PICMG 3.0 platforms (including front boards, rear transition modules, the backplane and the subrack, plus other shelf-specific FRUs), but there are many differences in detail. The CompactTCA connectors most relevant to this application are P1 and P2 on boards (referenced as J1 and J2 at the corresponding backplane positions). One key difference between the CompactTCA and AdvancedTCA PICMG telecommunications computing architectures is in the topology for the main IPMB, which is referenced in both architectures as IPMB-0. AdvancedTCA uses a redundant IPMB-0 comprising two architectural buses IPMB-A and IPMB-B, while CompactTCA uses a non-redundant IPMB-0 comprising a single architectural bus IPMB-A.

In both the AdvancedTCA and CompactTCA frameworks, the central management controller function of the present invention, which includes both a platform control element and a routing element, is referred to as the "shelf manager".

For purposes of this application, CompactTCA is very similar to a combination of two predecessor specifications: PICMG 2.16, the CompactPCI Packet Switched Backplane specification and PICMG 2.9, the CompactPCI System Management specification. References to CompactTCA can be assumed to refer to the predecessor specifications also, unless otherwise indicated.

Additionally, PICMG AMC.0, the Advanced Mezzanine Card (AdvancedMC) specification, defines a hot-swappable mezzanine FRU format for AdvancedTCA carrier boards. The main relevance of the AdvancedMC specification to the present invention is the use of an AdvancedMC module as a standardized FRU on which to implement the platform control element as an additional way to take advantage of the flexibility offered by disaggregation of star platform management bus architectures. Such an implementation would involve a root segment 322 between a platform control element 321 implemented on an AdvancedMC module and a routing element 323 located somewhere else in the shelf. That root segment 322 could use a small number of the pin positions available on the AdvancedMC module to connect with the AdvancedMC carrier board, which could then connect the root segment 322 through a small number of pins in an AdvancedTCA connector (perhaps in Zone 2 as described above) and thereby connect with a routing element 323 via the backplane. This configuration would allow the platform control element functionality to be implemented on an AdvancedMC module and optionally installed on a compatible AdvancedTCA board. This configuration option provides valuable flexibility in how the central management controller or shelf manager function is implemented in an ATCA shelf.

In some embodiments, the root segment 322 which communicatively links the platform control element 321 and the routing element 323 may consist of a pair of wires. Alternatively, the root segment 322 which communicatively links the platform control element 321 and the routing element 323 may consist of four wires or possibly two pairs of wires. For example, the root segment may use a separate pair of wires for each direction of communication. Any of these alternatives allows a root segment 322, or even two separate root segments, to be routed through the 8-pin shelf management controller port in ATCA base interface hub board Zone 2 connectors. Passing two root segments through the shelf management controller port is especially useful for ATCA, where (as elaborated below), the platform management bus is implemented on a dual redundant basis.

The branch segments 324, 326, although physically separate, may be part of a single logical bus. In such an embodiment, communications for any of the satellite MCs are sent to all of the satellite MCs along each of the branch segments. In other embodiments, there may be a plurality of logical buses among the branch segments. A first branch segment 326 may have its own logical bus; communication sent along the branch segment in such an embodiment may be limited to communication to and from the first satellite MC 327. Similarly, the second branch segment 324 may have its own logical bus, and communications sent along this logical bus in such an embodiment may be limited to communications to and from the second satellite MC 325. In embodiments with a plurality of logical buses, the routing element 323 may selectively route communications for particular satellite management controller only via the logical bus that includes the branch segment which links the routing element 323 and that particular satellite management controller.

In summary, for a star platform management bus architecture with the platform control element residing on a front board, but with the routing element residing off of the front board (that is, disaggregated), the number of wires required to be routed from the front board is significantly reduced. This may be particularly advantageous as wires routed from a front board typically route through a limited number of connectors whose pin assignments are largely, or entirely, pre-defined by industry standards. With the routing element located off of the front board, the root segments between the platform control element and the routing element may be routed through the connectors, but the (typically) far more numerous branch segments originate from a location off of the front board and therefore are not routed en masse through these limited connector spaces. This allows the benefits of star topology to be achieved even when the platform control element resides on a front board, or optionally on a front board. Thus, the central management controller can be located very flexibly in the shelf.

Figure 4:
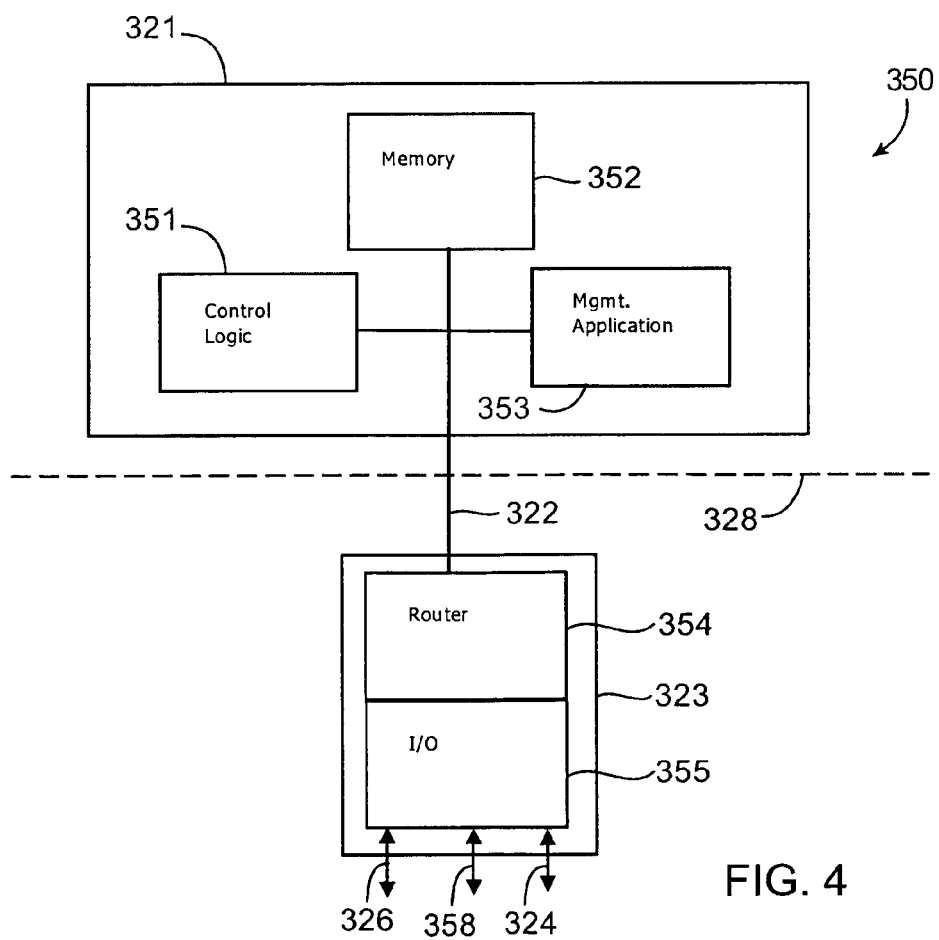
FIG. 4 is a block diagram illustrating internal components of the platform control element and routing element of a disaggregated star platform management bus system as in FIG. 3 according to the present invention.

FIG. 4 illustrates at 350 additional elements of the platform control and routing elements depicted in FIG. 3, as implemented in some embodiments of the present invention. The platform control element 321 may consist of a control logic portion 351, a memory portion 352, and a management application portion 353. The platform control element 321 is communicatively linked to the routing element 323 by the root segment 322.

The demarcation line 328 indicates the disaggregation of the platform control element 321 and the routing element 323. The routing element 323 may consist of a router 354, and an I/O interface 355. The branch segments 324, 358, 326 communicatively link the routing element 323 to satellite MCs located elsewhere in the system.

Figure 5:
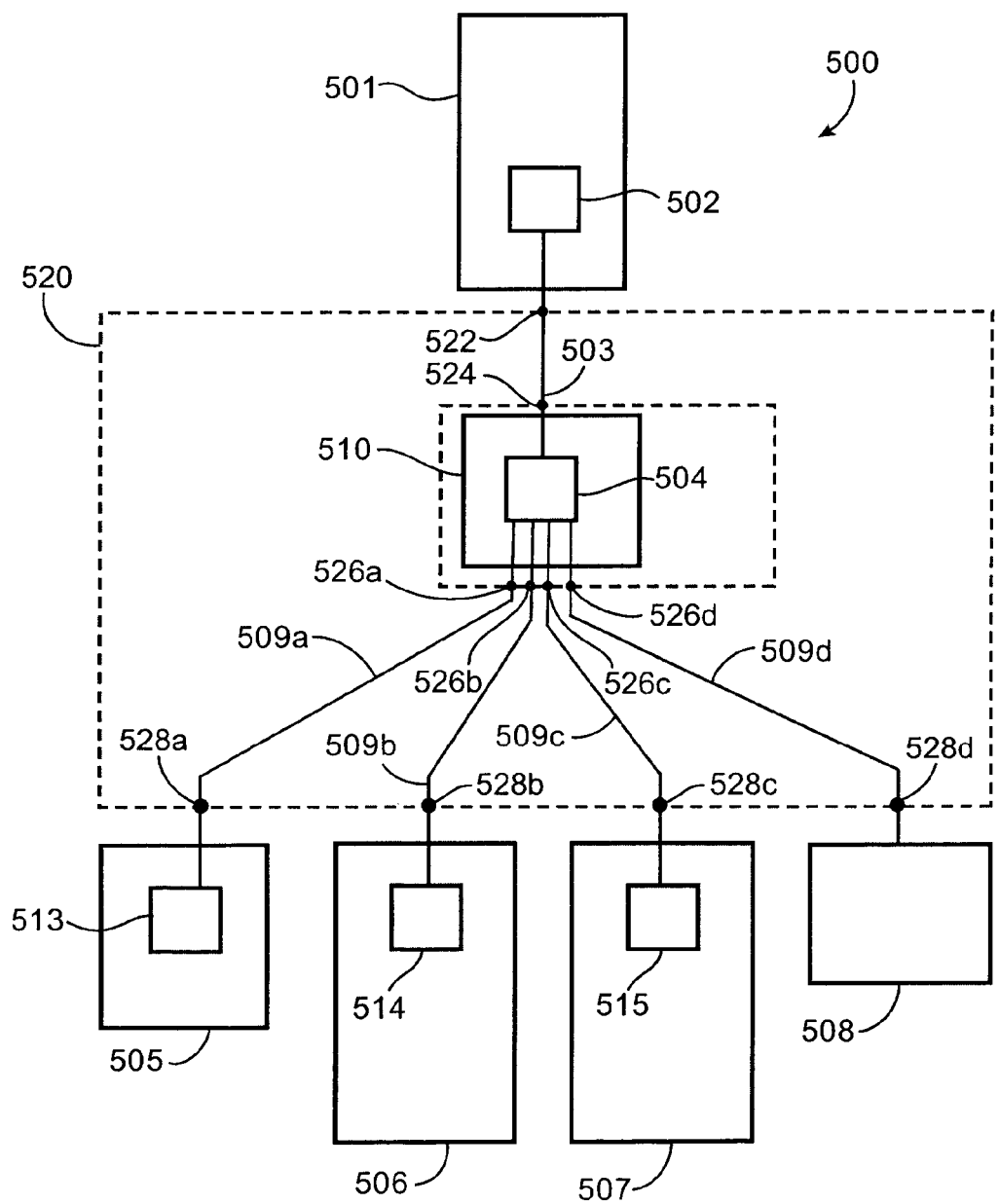
FIG. 5 illustrates a disaggregated star platform management bus system utilizing a single platform control element and a single routing element according to an embodiment of the present invention.

In a particular embodiment shown in FIG. 5, a platform management system 500 comprises a single platform control element 502 residing upon an FRU 501. In this illustrative embodiment, the platform control element 502 resides either directly or indirectly upon a front board 501. A routing element 504 is communicatively linked to the platform control element 502 via a root segment 503. The routing element 504 is communicatively linked to a plurality of satellite management controllers 513, 514, 515 via a plurality of branch segments 509a-c. The routing element 504 resides upon an FRU 510. The satellite management controllers 513, 514, 515 reside upon a plurality of FRUs 505, 506, 507. In this illustrative embodiment, some of the FRUs 506, 507 are front boards. The number and type of FRUs may vary across platform management applications, and the number of satellite management controllers may vary across platform management applications. It will further be shown below that in some embodiments, the front board 501, upon which the platform control element 502 resides, may also include a satellite control element (not shown) communicatively linked to the routing element 504. In other embodiments, routing element 504 may include communication links to devices other than intelligent FRUs, with platform control element 502 adapted to manage those links via root segment 503 and routing element 504. In some such embodiments, the additional devices could implement fan control and monitoring, or temperature monitoring. In yet other embodiments, the branch segments emerging from routing element 504 may connect to non-intelligent FRUs such as 508 (that is, FRUs that do not include a satellite management controller). The devices controlled by those branch segments could also have fan- or temperature-related functionality or even power supply/entry-related functionality, for example. Other embodiments described in this application can have non-intelligent FRUs as well, though further examples are not shown.

In configurations such as that shown in FIG. 5, a front board 501 implements a platform control element 502 to provide shelf-wide management, but does not implement an explicit satellite management controller to provide local management for that board. Typically in such a configuration, the central management controller would implement a logical satellite management controller to provide those local management functions. In this case, the backplane pins that are normally used for a branch segment to the on-board satellite management controller could be used instead for a root segment 503.

The branch segments 509a-d may be part of a single logical bus. In such an embodiment, communications for all of the satellite MCs are sent to all of the satellite MCs along each of the branch segments. In other embodiments, there may be a plurality of logical buses among the branch segments. A first branch segment 509a may be its own separate logical bus; communications sent along the branch segment in such an embodiment may be limited to communications to and from the first satellite MC 513 which resides upon a non-front board FRU 505. Similarly, a second branch segment 509b may be its own separate logical bus, and communications sent along this logical bus in such an embodiment may be limited to communications to and from the second satellite MC 514 which resides upon a front board 506. In still other embodiments, each of the branch segments may be part of a unique logical bus. In other embodiments, there is a plurality of logical buses, but a single logical bus may utilize more than one of the branch segments. In embodiments using a plurality of logical branch buses, the routing element may selectively route communications between the platform control element and the SMCs that are communicatively linked to a particular logical branch bus. The routing element may also selectively route communications from the SMCs that are communicatively linked to a first logical branch bus to the SMCs that are communicatively linked to a second logical branch bus.

The dashed lines 520 shown in FIG. 5 are intended to represent a backplane, or a backplane and auxiliary backplane, within which portions of the root segment 503 and branch segments 509a-509d include backplane circuit board traces as well as interfacing connectors at 522, 524, 526a-d and 528a-d. (Alternatively, the platform control element 502 could be mounted outside the subrack, and the root segment 503 could include a ribbon cable or the like, rather than including traces on a backplane 520.) As a consequence of this above described disaggregation of platform control element 502 and routing element 504, the root segment 503 can pass through a connector at 522 to the backplane 520, along a trace thereof, and thence through a board connector at 524 to routing element 504. Similarly, the branch segments 509*a-d* can pass through board connectors at 526*a-d*, backplane traces and board connectors at 528*a-d* to the satellite management controllers 513-515 and non-intelligent FRU 508.

In embodiments using a plurality of branch segments, the opportunities for fault isolation are enhanced. If the satellite MC on one of the physical branch segments is disrupting system operation, that segment can be electrically isolated so that the rest of the shelf can return to normal operation. The disrupting satellite MC and the FRU upon which it resides can be physically replaced later. This ability to effectively repair a system disrupted by such a fault, via electrical isolation of the disruptive branch segment and satellite MC, yields a drastic reduction in Mean Time To Repair (MTTR) because it can be effected remotely, without physically visiting the disrupted system, which may be in a remote location. The fault isolation advantages are available regardless of whether the physical branch segments are separated into distinct logical buses.

In embodiments using a plurality of logical branch buses, the system yields additional advantages. For example, the plurality of logical branch buses allows for address isolation between logical buses. All participants in a single logical or physical IPMB must have distinct IPMB addresses. In contrast, address assignments can be completely independent between distinct logical buses.

Another advantage of using a plurality of logical branch buses is that bandwidth can be dedicated for each logical branch bus. For example, a satellite MC on a distinct logical branch bus can use the entire bandwidth of the branch bus to communicate with the associated routing element. Dedicated bandwidth for each satellite MC is a benefit in scenarios with a high volume of IPMI messages. Such high volumes can occur when a shelf is started or a board is hot-inserted, or during periods when problems, such as high temperatures, affect several intelligent FRUs at once, and possibly many sensors of each. In such circumstances, sharing a single 100 kHz IPMB for all this messaging can significantly slow the shelf manager's ability to receive, process, and respond to events in the shelf.

Other advantages of using a plurality of logical branch buses include the use of different protocols on each logical branch bus, and message content isolation between logical branch buses.

Although the advantages of logical branch buses described above are available in the prior art, such as that shown in the patent and application to Hawkins et al. or in the AdvancedTCA Modular Communications Platform Design Guide, both mentioned above, the present invention makes these advantages achievable in more attractive configurations wherein the platform control element of a central management controller is implemented on a front board in a standardized modular architecture such as AdvancedTCA.

The platform management system 500 is consistent with PICMG 2.5x (CompactTCA). Embodiments consistent with CompactTCA require radial board control signals managed by the central management controller. In such embodiments, the FRU on which the routing element resides may also include the fan out of the pairs of radial board control signals that CompactTCA requires, one pair for each front board slot.

The current draft CompactTCA specification omits the concept of a central management controller (shelf manager) on a front board, because insufficient pins are available on a front board to route potentially tens of such required radial board control signals from the front board to the backplane. Using disaggregation, however, with the routing element disposed on an auxiliary FRU having a large number of available connector pins leading to an auxiliary backplane or extended backplane, or with the routing element mounted elsewhere in the shelf and connected to the backplane with a ribbon cable or the like, such a configuration is feasible. In such case, the required radial board control signals for each front board slot all emanate from the FRU on which the routing element resides, or another FRU communicatively linked to the platform control element.

The branch segments 509*a-d* are routed to their respective satellite management controllers 513, 514, 515 and non-intelligent FRU 508 via two pins in the P1/J1 connectors 528*b*, 528*c* of the front boards 506, 507 and similarly, via two FRU-specific pins on pairs of connectors at 528*a*, 528*b* of the non-front board FRUs 505, 508. As shown in FIG. 5, the disaggregation of the platform management system 500, i.e., the mounting of platform control element 502 on a front board 501 separate from the FRU mounting the routing element 504, significantly reduces the number of lead outs from the front board 501 via the Px/Jx connectors at 522.

A CompactTCA system implements a non-redundant IPMB-0. In the platform management system of FIG. 5, the root segment 503, the routing element 504 and the branch segments 509*a-c* constitute the non-redundant IPMB-0. (Non-intelligent FRUs such as 508 do not participate in IPMB-0 in the CompactTCA architecture.) Assuming that the platform control element 502 emulates the function of a satellite management controller for front board 501 and that the root segment 503 is a two-wire implementation, it can use the two pins designated for IPMB-0 in the P1/J1 connectors (not shown). The dozens of pins required for a star topology IPMB-0 and the CompactTCA radial control signals can all be implemented on FRU 510 which includes the routing element 504.

Figure 6:
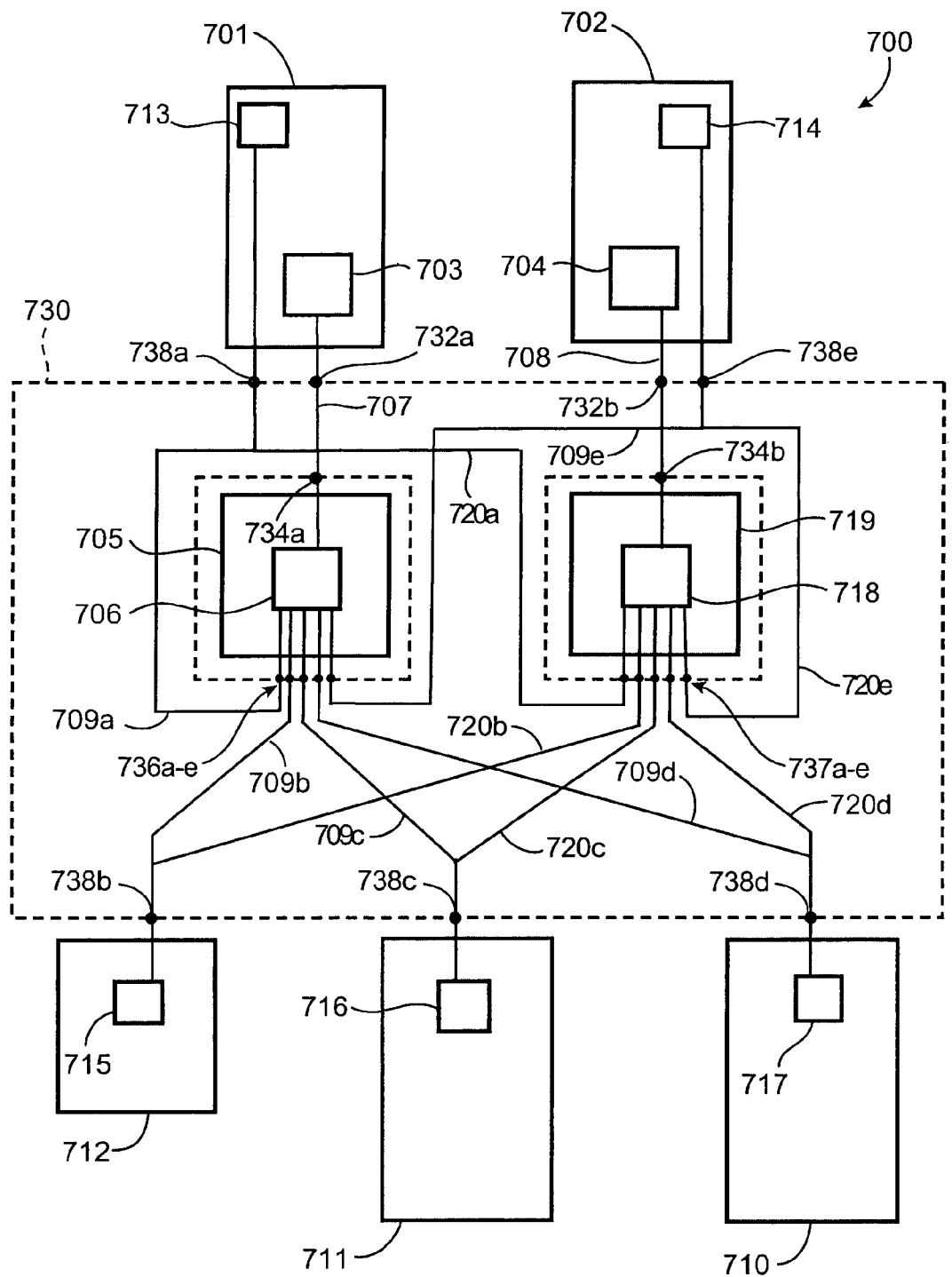
FIG. 6 illustrates a disaggregated star platform management bus system utilizing dual platform control elements and two routing elements according to another embodiment of the present invention.

In another embodiment, depicted in FIG. 6, a platform management system 700 utilizes two platform control elements and two routing elements, disaggregated in accordance with the present invention. As illustrated, a first platform control element 703 resides upon a first FRU, or front board 701, and a second platform control element 704 resides upon a second FRU, or front board 702. The first platform control element and the second platform control element may be adapted to provide central management controller functions on a redundant basis.

A first routing element 706 is communicatively linked to the first platform control element 703 via a first root segment 707, while the second routing element 718 is communicatively linked to the second platform control element 704 via a second root segment 708. The first routing element 706 resides upon a third FRU 705, and the second routing element 718 resides upon a fourth FRU 719.

The dashed box 730 shown in FIG. 6 is intended to represent a backplane, or a backplane and/or auxiliary backplane, within which the root segments 707 and 708 include connectors at 732*a*/734*a* and 732*b*/734*b*, respectively, as well as backplane traces, and within which the branch segments 709*a-e* and 720*a-e* include traces and interfacing connectors 736*a-e*, 737*a-e* and 738*a-e*. As a consequence of this disaggregation of platform control elements 703 and 704, and routing elements 706 and 718, the root segments 707 and 708 can pass through the connectors at 732*a* and 732*b* to the backplane 730, along traces thereof, and thence through board connectors at 734a and 734b to routing elements 706 and 718. Similarly, the branch segments 709a-709e can pass through board connectors at 736a-e, backplane traces and board connectors at 738a-e to the satellite controllers 713, 714, 715, 716 and 716, and the branch segments 720a-720e can pass through board connectors at 737a-e, backplane traces and board connectors at 738a-e to the satellite controllers, 713, 714, 715, 716 and 716.

Although the platform management system 700 has two platform control elements 703, 704, as well as two routing elements 706, 718, this embodiment is a non-redundant IPMB-0 system. Each SMC (SMC 715, for example) has a single IPMB-0 port. Thus, the two branch segments (709b, 720b, for example) that link to a single SMC (715, in this example) will be co-terminated at the same single port (738b in this example). This embodiment is a redundant central MC system with redundant platform control elements 703, 704, as well as redundant routing elements 706, 718. Therefore, the IPMB-0 port of each SMC (SMC 715, for example) is communicatively linked to both routing elements 706 and 718 and thereby to both platform control elements 703 and 704. This redundant central MC, non-redundant IPMB-0 embodiment may be used in a CompactTCA compliant system.

The first routing element 706 is communicatively linked to the plurality of satellite management controllers 713, 714, 715, 716, 717 via the first plurality of branch segments 709a-e. The second routing element 718 is communicatively linked to the plurality of satellite management controllers 713, 714, 715, 716, 717 via the second plurality of branch segments 720a-e. The satellite management controllers reside upon a plurality of FRUs. In this illustrative embodiment, some of the FRUs 701, 702, 710, 711 are front boards. One FRU 712 is not a front board in this embodiment; it could be a fan tray, for instance. The number and type of FRUs may vary across platform management applications, and the number of satellite management controllers may vary across platform management applications as well.

The satellite MC 713 resides upon the same first FRU 701 upon which the first platform control element 703 resides. The satellite MC 714 resides upon the same second FRU 702 upon which the second platform control element 704 resides. The FRUs upon which the platform control elements reside may or may not have a satellite MC, depending upon the application. If those satellite MCs are missing, typically the platform control elements will include a functional emulation of the missing satellite MCs.

As in the embodiment of FIG. 5, various types of connectors are used at 732a-b, 734a-b, 736a-e, 737a-e, and 738a-e to connect signal paths on the front boards to traces on the backplane 730.

Figure 7:
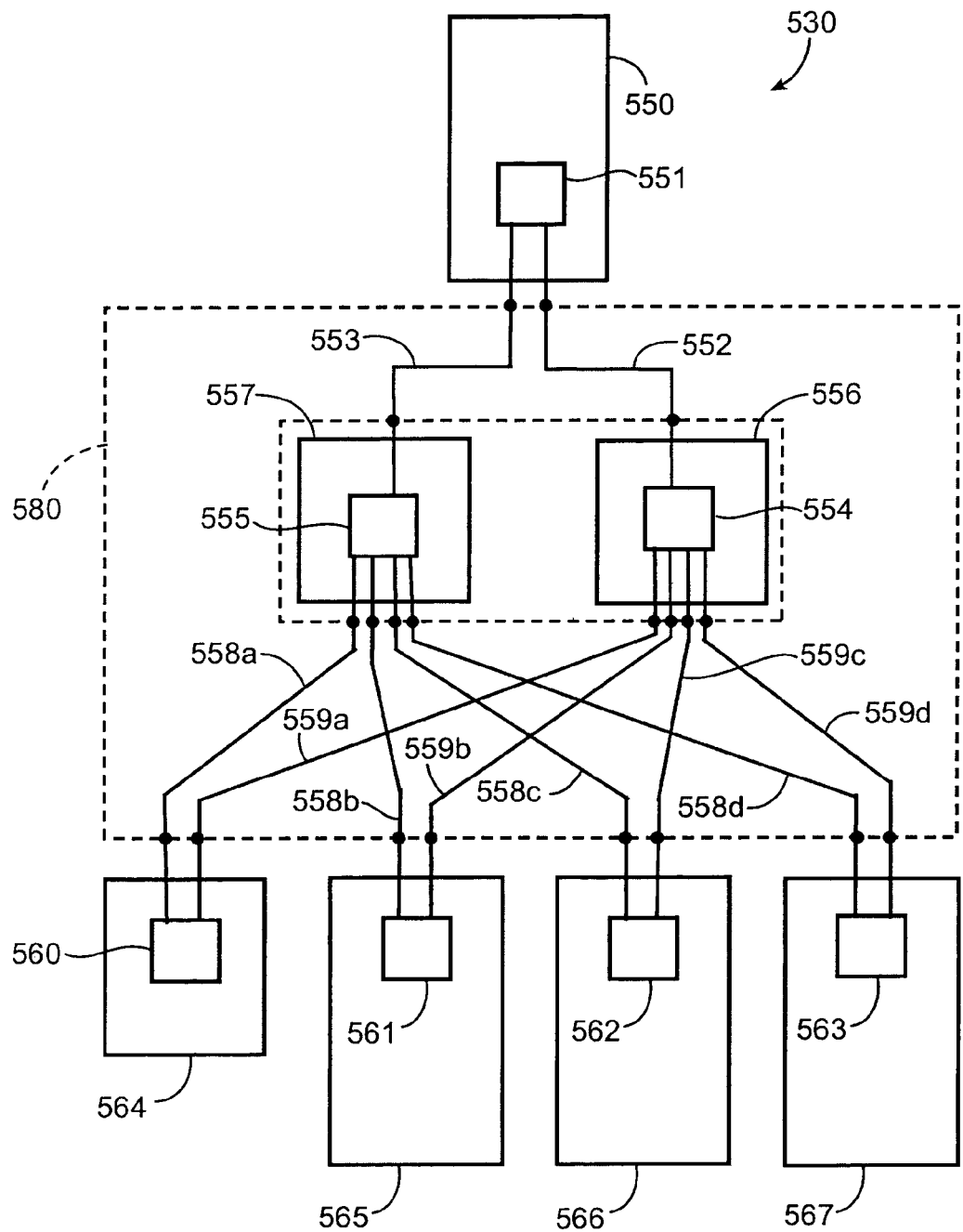
FIG. 7 illustrates a disaggregated star platform management bus system utilizing a single platform control element and two routing elements according to another alternative embodiment of the present invention.

In another alternative in accordance with the present invention as shown at 530 in FIG. 7, a platform management system consists of a single platform control element 551 residing upon an FRU 550. In this illustrative embodiment, the platform control element 551 resides upon a front board. Two routing elements 554, 555 are communicatively linked to the platform control element 551 via redundant root segments 552, 553. The platform control element 551 is communicatively linked to the first routing element 554 via the first root segment 552. The platform control element 551 is communicatively linked to the second routing element 555 via the second root segment 553.

The first routing element 554 is communicatively linked to a plurality of satellite management controllers 560, 561, 562, 563 via a plurality of branch segments 559a-d. The first routing element 554 is disaggregated from the platform control element 551 by placing it on a distinct FRU 556 communicatively coupled to the backplane 580. The second routing element 555 is likewise communicatively linked to the plurality of satellite management controllers 560, 561, 562, 563 via a plurality of branch segments 558a-d. The second routing element 555 is also disaggregated from the platform control element 551 by virtue of its placement on a FRU 557 that is distinct from the front board 550 upon which the platform control element 551 resides. Alternatively, the routing elements 554 and 555 could reside upon a common FRU.

Note that this embodiment is, like the two previous embodiments, disaggregated by separation of the platform control element 551 from the routers 554 and 555, and the interconnection thereof via a backplane as suggested by the dashed lines 580. Note also that although not specifically identified, board connectors like those of FIG. 6 are also included. In this embodiment, there are two architectural buses which may be referred to as the A bus and the B bus. Typically, one of the routing elements linked to the platform control element will be part of the A architectural bus, while the other routing element will be part of the B architectural bus.

In an ATCA environment, there are two architectural buses. In such a redundant IPMB-0 system, one of the architectural buses, with its root segment, and its associated routing element and branch segments, is referred to as IPMB-A, and the other architectural bus, with its root segment, and its associated routing element and branch segments, is referred to as IPMB-B. A satellite MC in an ATCA environment has an A port and a B port. Using platform management system 530 as an illustrative embodiment of an ATCA compliant system, for example, the IPMB-A root segment 552 linked to routing element 554 would communicate to the satellite MCs 560, 561, 562, 563 using branch segments 559a-d which are communicatively linked to the A ports of the satellite MCs. Similarly, the IPMB-B root segment 553 linked to routing element 555 would communicate to the satellite MCs 560, 561, 562, 563 using branch segments 558a-d which are communicatively linked to the B ports of the satellite MCs.

In some embodiments, there is a plurality of logical buses among the branch segments. Each physical branch segment may have its own logical bus, and communications sent along the logical branch bus in such an embodiment may be limited to communications to and from a single satellite MC. In some embodiments, there is a plurality of logical buses, but a single logical bus may utilize more than one of the branch segments.

In embodiments using a plurality of logical branch buses, the routing element may selectively route communications between the platform control element and the SMCs that are communicatively linked to a particular logical branch bus. The routing element may also selectively route communications from the SMCs that are communicatively linked to a first logical branch bus to the SMCs that are communicatively linked to a second logical branch bus.

The satellite management controllers reside on a plurality of FRUs 564, 565, 566, 567. In this illustrative embodiment, some of the FRUs 565, 566, 567 are front boards while FRU 564 is some sort of auxiliary FRU, perhaps a fan tray. The number and type of FRUs may vary across platform management applications, and the number of satellite management controllers may likewise vary across platform management applications. Although not depicted in this illustration, in some embodiments, the front board 550, wherein the platform control element 551 resides, may also have a satellite management controller communicatively linked to the first and second routing elements 554, 555.

Figure 8A:
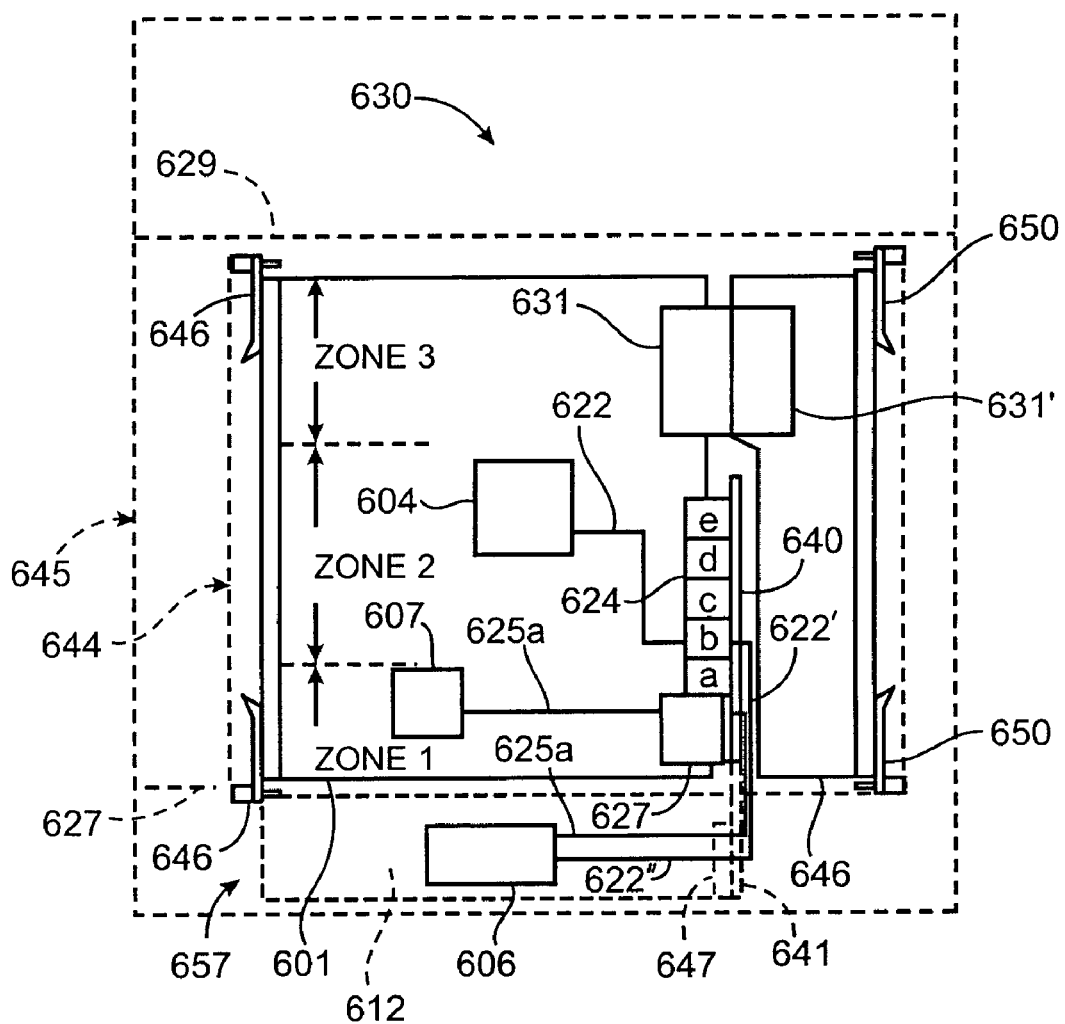
FIGS. 8a and 8b depict partial side and front views of a shelf illustrating certain features of the present invention.
Figure 8B:
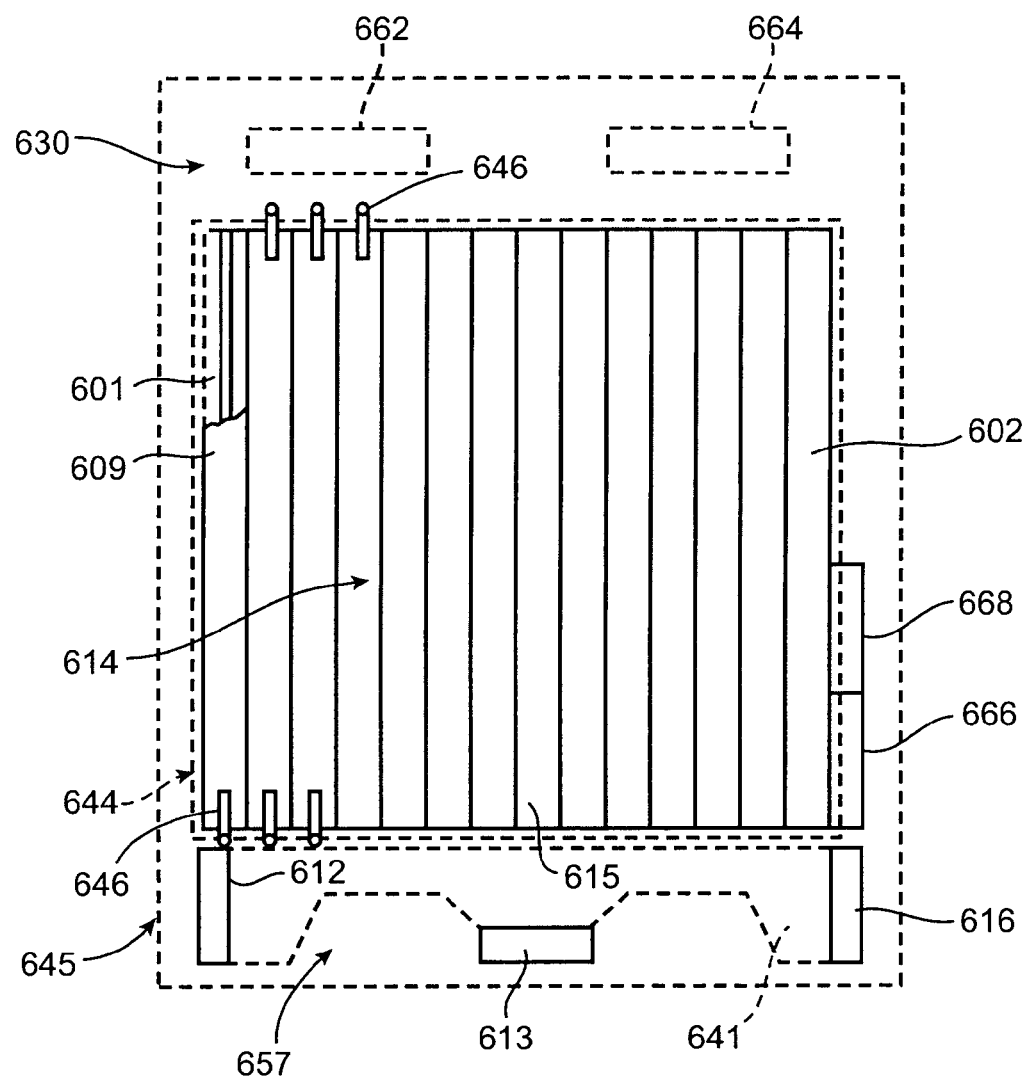

As previously pointed out, in accordance with the present invention, the disaggregated star platform management system is utilized in an electronic platform consistent with the PICMG ACTA or cTCA specifications. In FIGS. 8a and 8b, the illustrated details are specific to ATCA, but similar representations could be made for cTCA. The dashed outer box 645 in FIG. 8a encompasses a side view of the boundaries of an electronic shelf or chassis of the type referred to above, while the dashed box 645 in FIG. 8b likewise identifies the limits of a front view thereof. The shelf may be considered as being divided into a subrack area 644 lying between a lower air plenum area 657 and an upper air plenum area 630, respectively delimited by the dashed lines 627 and 629. In FIG. 8a, one of a plurality of front boards is shown at 601 and is held in engagement with the shelf and a backplane 640 by a pair of latches 646 on its front edge (details not shown) and a plurality of connectors 624a-e, and 627 on its back edge. Note that an extended backplane, or auxiliary backplane 641 may extend into the lower plenum area 657 where it is engaged by an auxiliary FRU 612 shown in dashed lines and connected to the extended backplane by a connector 647. Behind and aligned with the front board 601 is a rear transition module (RTM) 646. The RTM 646 is held in engagement with the front board 601 by a connector 631' that mates with a connector 631 on front board 601, and by a pair of rear latches 650 that affix it to the shelf (details not shown). The Zone 3 (ATCA) connectors 631 and 631' are not utilized for platform management purposes in this embodiment.

A platform control element 604 resides upon the front board 601 in the shelf 645. The root segment connecting platform control element 604 to the routing element 606 mounted on the FRU 612 beneath the subrack in the shelf 645 consists of three or more sub-segments; a first sub-segment 622 which routes the root segment from the platform control element 604 to the Zone 2 connector 624b, a second sub-segment in the form of a trace 622' in backplane 640 which routes the root segment from the Zone 2 connector 624b to the connector 647 (shown in dashed lines), and a third sub-segment 622" leading to the routing element 606 as further explained and illustrated below.

In this example, a satellite MC 607 is also mounted on the front board 601. The satellite MC 607 is communicatively linked to the routing element 606 via a branch segment 625a and Zone 1 connector 627 as will be described below. In some embodiments (which typically would omit the satellite MC 607 on the front board 601 that includes the platform control element 604), root segment 622 will emerge from front board 601 via a Zone 1 connector 627 instead of the Zone 2 connector 624b. A discussion of the role played by the backplane 640 is provided below.

FIG. 8b illustrates a partial front view of the shelf 645 showing potential mounting locations for FRUs used in platform management according to some embodiments of the present invention. A plurality of front boards (601, 602, 614, 615, for example) are mounted in shelf 645 in the standardized subrack area delimited by the dashed box 644 in FIG. 8b. Note that each of the front boards has a flat face plate (labeled 609 and shown broken away in the case of board 601) that in conjunction with the face plates of other boards forms a front closure for a ventilating air path extending upward between the boards.

The upper air plenum 630 above subrack 644 allows for the possible placement of FRUs 662, 664 therein. The FRUs may contain routing elements or platform control elements; for instance FRU position 662 in the upper air plenum of FIG. 8b could be occupied by the routing element 606 that is shown in the lower air plenum area of the side view of FIG. 8a. The air plenum 657, below the subrack 644, allows for the possible placement of other FRUs 612, 616 that might contain routing elements or platform control elements. Auxiliary FRU 613 in the lower air plenum 657 might provide storage for shelf configuration data. As will be further described below an auxiliary backplane 641 may also extend into the lower air plenum 657. FRUs 666, 668 may also be mounted to the right of the subrack 644 (FIG. 8b) and may contain routing elements or platform control elements. Space and cooling capacity for FRUs outside the subrack is often highly constrained. The disaggregation of routing elements and platform control elements according to the present invention can simplify meeting constraints by placing the platform control element on a front board within the subrack, leaving only the routing element(s) of a star platform management bus implementation to be mounted outside the subrack, with corresponding reductions in the size and cooling requirements of the FRUs mounted outside the subrack.

In some embodiments of the present invention, a FRU may itself have replaceable modules. In embodiments based on the AMC.0 specification, the replaceable modules are referred to as AdvancedMCs, and plug into a carrier that is an AdvancedTCA board. In some such embodiments, the platform control element resides on an AdvancedMC, where both the AdvancedMC and its carrier board are adapted to support that usage. In such embodiments of the present invention, a star topology platform management bus architecture and AdvancedMC-based platform control elements can be practical, where otherwise this combination would likely not be practical. Other embodiments of the present invention involving FRUs mounted on other FRUs are possible.

Figure 9:
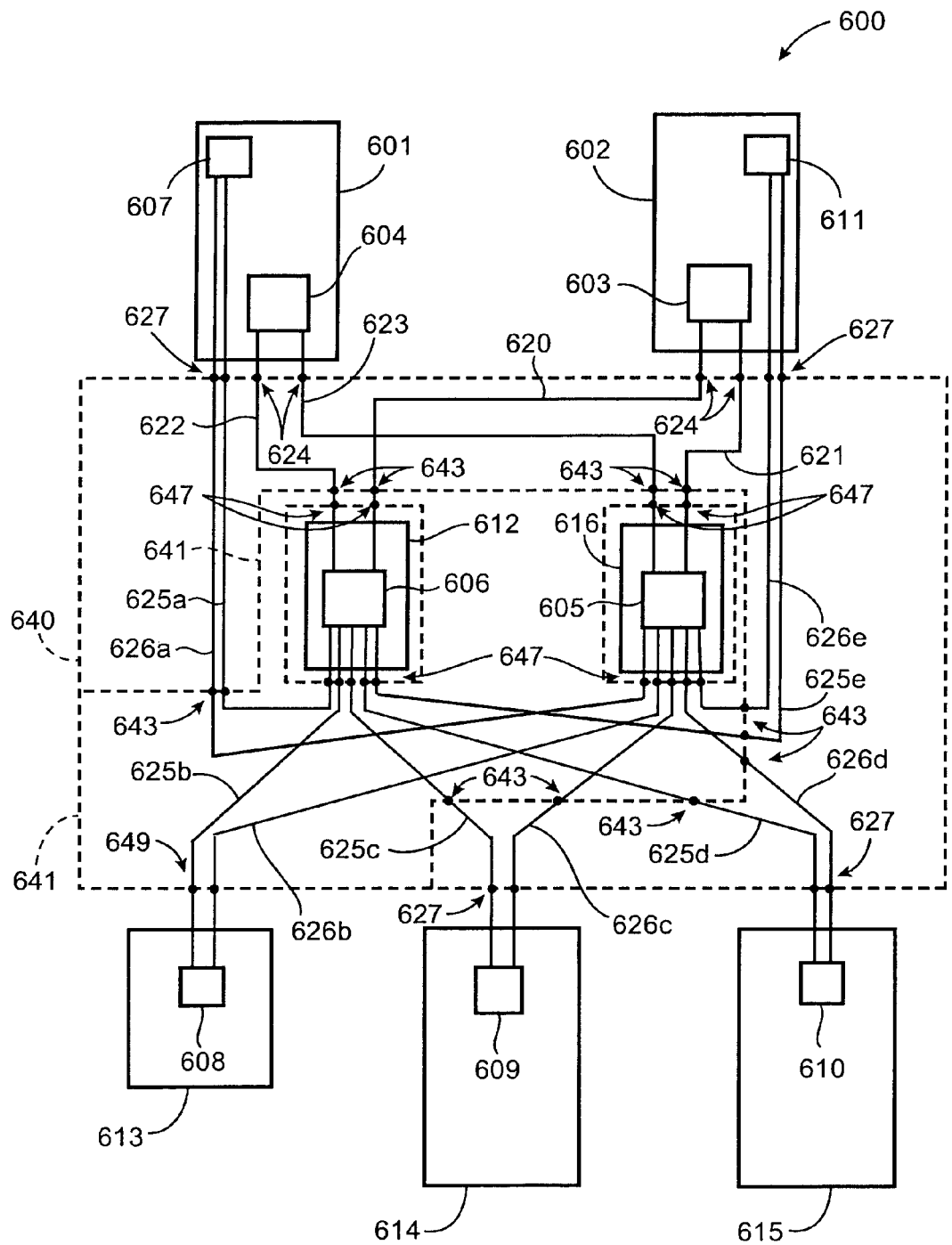
FIG. 9 illustrates a disaggregated star platform management bus system in accordance with the present invention utilizing two platform control elements and two routing elements that might be mounted in a shelf such as that depicted in part in FIGS. 8a and 8b.
Figure 10:
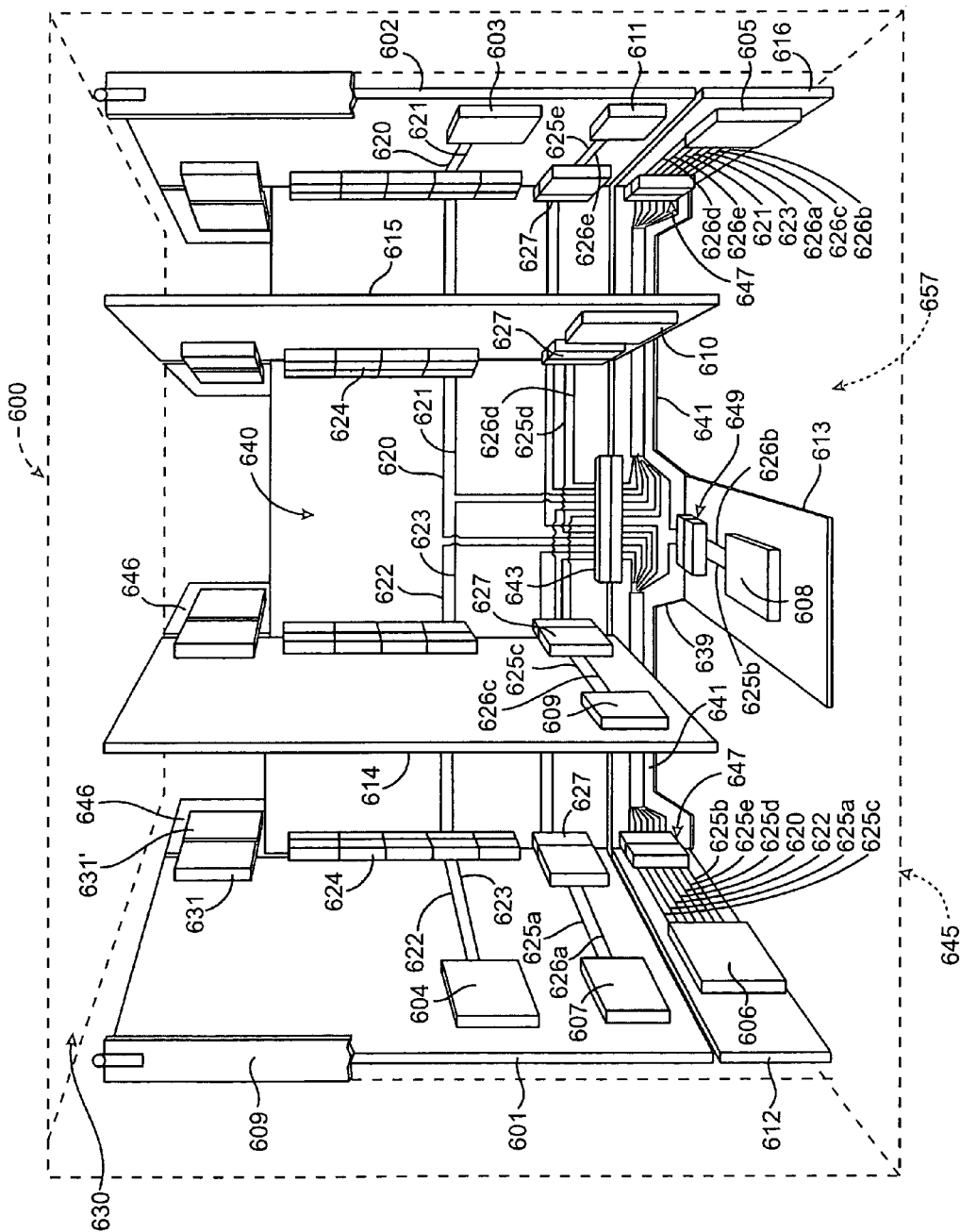
FIG. 10 depicts a pictorial illustration of the embodiment of FIG. 9.

Referring now to the block diagram of FIG. 9 and the corresponding pictorial diagram shown in FIG. 10, a platform management system is shown at 600 which utilizes two platform control elements 603, 604. In this illustrative embodiment the two routing elements 605, 606 are not located on either of the FRUs upon which the platform control elements 603, 604 are located. Instead, the two routing elements 603, 604 reside on two separate FRUs 612, 616 that are connected to an auxiliary backplane symbolically identified by the region delimited by the dashed outline 641 in FIG. 9 and designated by 641 in FIG. 10. Note that as illustrated at 639 (in FIG. 10) as much as possible of the auxiliary backplane 641 is removed so as to reduce interference with air flow through the lower plenum 657 to a minimum. The platform control elements may also reside upon FRUs of another type.

In this embodiment the first platform control element 604 is communicatively linked to each of the two routing elements 605, 606 via redundant root segments 623, 622, respectively, that extend through backplane traces via connectors at 624 and 643, and auxiliary backplane traces via connectors 643 and 647 as signified by the labeled dots in FIG. 9, and by the corresponding labeled connectors and traces schematically depicted in FIG. 10. The second platform control element 603 is also communicatively linked to each of the two routing elements 605, 606 via redundant root segments 621, 620, respectively, that similarly pass through the connectors 624 and 643, and 643 and 647. In this embodiment, the routing elements 605 and 606 reside upon separate FRUs 616 and 612. In some embodiments, the two platform control elements 603, 604 are adapted to provide central management controller functions on a redundant basis. In some such embodiments, one of the platform control elements is operated in an active mode while the other platform control element is operated in a standby mode.

In the embodiment of FIGS. 9 and 10, there are two architectural buses which may be referred to as the "A" architectural bus and the "B" architectural bus. Typically, one of the routing elements linked to each of the platform control elements will be part of the A architectural bus, while the other routing element will be part of the B architectural bus.

In an ATCA environment, one of the architectural buses, with its root segment and its associated routing element and branch segments, is referred to as IPMB-A, and the other architectural bus, with its root segment and its associated routing element and branch segments, is referred to as IPMB-B. Correspondingly, a satellite MC in an ATCA environment has an A port and a B port. Using platform management system 600 as an illustrative embodiment, for example, the IPMB-A root segment 622 linking the first platform control element 604 to the first routing element 606 will communicate with the satellite MCs 607, 608, 609, 610, 611 using branch segments 625*a-e*, which are communicatively linked through auxiliary backplane traces via connectors 647 and 649 in the case of FRU 613, and through auxiliary backplane traces via connectors 647 and 643, and backplane traces via connectors 643 and 627 in the cases of FRUs 601, 602, 614 and 615 to the A ports of the satellite MCs. The IPMB-A root segment 620 linking the second platform control element 603 to the first routing element 606 will also communicate with the satellite MCs 607, 608, 609, 610, 611 using branch segments 625*a-e*, which are likewise variously communicatively linked via the connectors 627,643, 647 and 649 to the A ports of the satellite MCs.

The IPMB-B root segment 623 linking the first platform control element 604 to the second routing element 605 will communicate with the satellite MCs 607, 608, 609, 610, 611 using branch segments 626*a-e*, which are also variously communicatively linked to the B ports of the satellite MCs through the connectors 627,643, 647 and 649. The IPMB-B root segment 621 linking the second platform control element 603 to the second routing element 605 will also communicate with the satellite MCs 607, 608, 609, 610, 611 using branch segments 626*a-e* (and their associated backplane traces and auxiliary backplane traces and connectors as in the case of the IPMB-A branch segments), which are communicatively linked to the B ports of the satellite MCs. In this embodiment, each of the platform control elements uses the same routing element for IPMB-A and IPMB-B, respectively; i.e., each routing element is shared by both platform control elements for either IPMB-A or IPMB-B.

The plurality of satellite management controllers 607, 609, 610, 611 reside individually on a plurality of front boards 601, 614, 615, 602; satellite management controller 608 resides on a non-front board in this example. Any number of such satellite management controllers and front boards may be used. These satellite management controllers, plus satellite MC 608, are communicatively linked to the routing elements 605, 606 by the pluralities of branch segments 625*a-e*, 626*a-e*.

In some embodiments, the plurality of branch segments 625*a-e* constitutes a single first logical bus, and the corresponding plurality of branch segments 626*a-e* constitutes a single second logical bus. In such embodiments, all of the communications sent to any management controller via the first or second logical buses are sent to all management controllers communicatively linked to that logical bus.

In other embodiments, there are a first plurality of logical buses among the first plurality of branch segments 625*a-e*, and a second plurality of logical buses among the second plurality of branch segments 626*a-e*. The first branch segment 626*a* may have its own logical bus; communications sent along the logical branch bus in such an embodiment may be limited to communications to and from the first satellite MC 607 which resides upon the first front board 601. Similarly, the second branch segment 626*b* may have its own logical bus, and communications sent along this logical branch bus may be limited to communications to and from the second satellite MC 608 which resides upon an auxiliary FRU 613 in the illustrated configuration.

In some embodiments, each of the branch segments of the first plurality of branch segments 625*a-e* is part of a unique logical bus. In some embodiments, each of the branch segments of the second plurality of branch segments 626*a-e* is part of a unique logical bus. In some embodiments, there is a plurality of logical buses, but a single logical bus may utilize more than one of the branch segments. In embodiments using a plurality of logical branch buses, the routing element may selectively route communications between the platform control element and the SMCs that are communicatively linked to a particular logical branch bus. The routing element may also selectively route communications from the SMCs that are communicatively linked to a first logical branch bus to the SMCs that are communicatively linked to a second logical branch bus.

Figure 11:
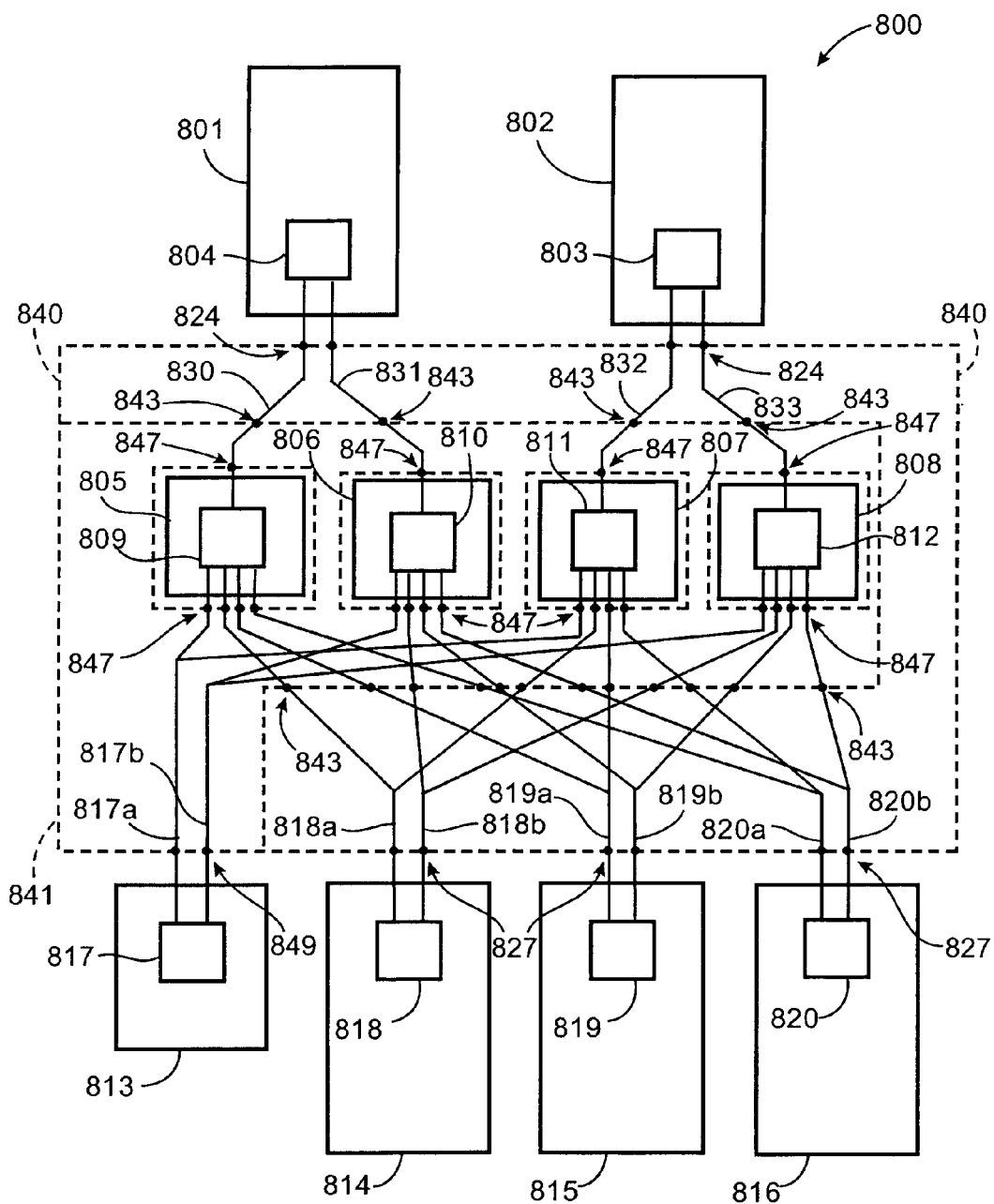
FIG. 11 illustrates a disaggregated star platform management bus system utilizing two platform control elements and four routing elements according to still another embodiment of the present invention.
Figure 12:
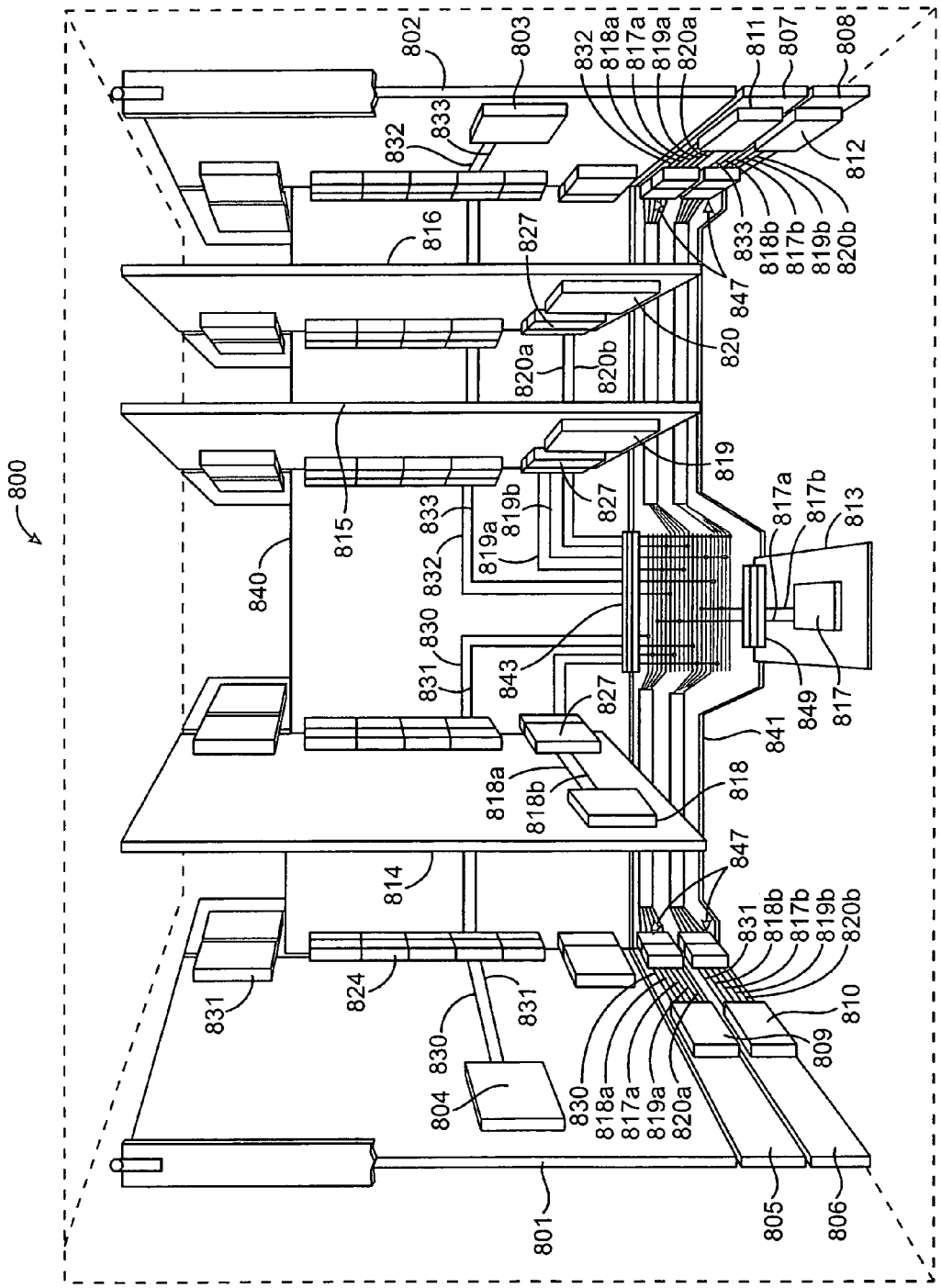
FIG. 12 depicts a pictorial illustration of the embodiment of FIG. 11.

In another embodiment of the present invention shown in FIGS. 11 and 12, a platform management system 800 utilizes two platform control elements 803, 804 and four routing elements 809, 810, 811, 812. The routing elements 809, 810, 811, 812 respectively reside upon FRUs 805, 806, 807, 808. In this illustrative embodiment, the four routing elements 809, 810, 811, 812 are not located on either of the FRUs 801, 802 upon which the platform control elements 803, 804 are located. Two or more of the routing elements may reside upon a common FRU. The first platform control element 804 is communicatively linked to each of the two routing elements 809, 810 via redundant root segments 830, 831 that pass through backplane traces via connectors 824 and 843, and through auxiliary backplane traces via connectors 843 and 847. The second platform control element 803 is communicatively linked to each of the two routing elements 811, 812 via redundant root segments 832, 833 that also pass through backplane traces via connectors 824 and 843, and through auxiliary backplane traces via connectors 843 and 847. In some embodiments, the two platform control elements 803, 804 are adapted to provide central management controller functions on a redundant basis. In some such embodiments, one of the platform control elements 803, 804 is in an active mode while the other platform control element is in a standby mode.

A plurality of satellite management controllers 817, 818, 819, 820 reside individually on a plurality of FRUs 813, 814, 815, 816. In this illustrative example, some of the FRUs 814, 815, 816 are front boards while FRU 813 is an auxiliary FRU of some sort, perhaps providing access to configuration information about the shelf. Any number of such satellite management controllers and front boards may be used. The plurality of satellite management controllers 817, 818, 819, 820 is communicatively linked to the routing elements 809, 810, 811, 812 by a plurality of branch segments that in the case of SMC 817 includes auxiliary backplane traces and connectors 847 and 849, and in the cases of SMCs 818, 819 and 820 include auxiliary backplane traces linking connectors 847 and 843, and backplane traces linking connectors 843 and 827.

In some embodiments, the plurality of branch segments that are communicatively linked to the A ports of the satellite MCs are part of a first logical bus, and the plurality of branch segments that are communicatively linked to the B ports of the satellite MCs are part of a second logical bus. In such embodiments, all of the communications sent to and from the routing elements and all of the satellite management controllers on a particular logical bus are sent to all of the routing elements and all of the satellite management controllers on that same logical bus.

In other embodiments, there are two architectural buses, which may be referred to as the A bus and the B bus. Typically, one of the root segments and a corresponding routing element linked to each of the platform control elements will be part of the A architectural bus, while the other root segment and a corresponding routing element for each of the platform control elements will be part of the B architectural bus. In such a case, the A routing elements, for example 809, 811, will be communicatively linked to the A ports 817*a*, 818*a*, 819*a*, 820*a* of the satellite management controllers, and the B routing elements, for example 810, 812 will be communicatively linked to the B ports 817*b*, 818*b*, 819*b*, 820*b* of the satellite management controllers.

In other embodiments, there may be a plurality of logical buses among the branch segments. Each physical branch segment may have its own logical bus; communications sent along the branch segment in such an embodiment may be limited to communications to and from a single satellite MC. Alternatively, there may be a plurality of logical buses, but a single logical bus may utilize more than one of the branch segments. In embodiments using a plurality of logical branch buses, the routing element may selectively route communications between the platform control element and the SMCs that are communicatively linked to a particular logical branch bus. The routing element may also selectively route communications from the SMCs that are communicatively linked to a first logical branch bus to the SMCs that are communicatively linked to a second logical branch bus.

In some embodiments, the satellite MCs 817, 818, 819, 820 will have an A port and a B port (4 connector pins total in some such embodiments). In the case of four routing elements, the number of branch segments (4 segments, 8 wires in some such embodiments) coming into the satellite MC may exceed the number of available ports (2 ports, 4 wires in some such embodiments). In such cases, there may be shared access to satellite MC ports between the routing elements. Typically, one of the routing elements linked to each of the platform control elements will be part of the A architectural bus, while the other routing element for each of the platform control elements will be part of the B architectural bus. In such a case, the A routing elements, for example 809, 811, will be communicatively linked to the A ports 817*a*, 818*a*, 819*a*, 820*a* of the satellite management controllers, and the B routing elements, for example 810, 812, will be communicatively linked to the B ports 817*b*, 818*b*, 819*b*, 820*b* of the satellite management controllers. In such embodiments, the A architectural bus from the first platform control element will be joined with the A architectural bus from the second platform control element at the satellite MC A port, typically by the sharing of a connector pin by two wires (one wire from each of the routing elements associated with that port), with similar connections for the B architectural bus.

Figure 13:
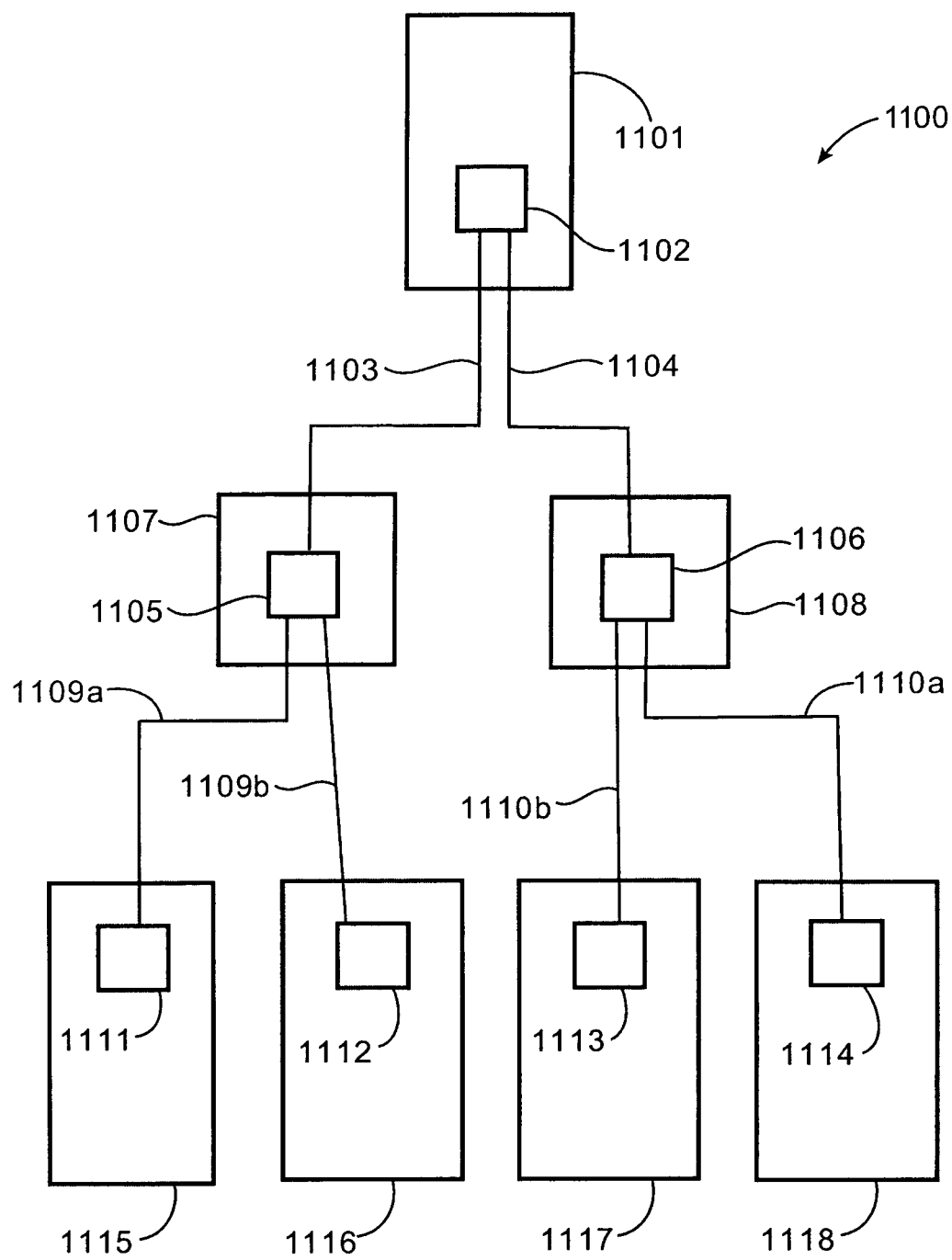
FIG. 13 illustrates a disaggregated star platform management bus system according to yet another embodiment of the present invention.

In yet another embodiment, which is generally depicted in FIG. 13, a platform management system may utilize one platform control element and two routing elements as in FIG. 7, but each routing element may not communicate with each satellite controller. In this configuration a first platform control element 1102 resides upon a first FRU 1101, a front board adapted to provide central management controller functions.

A first routing element 1105 is communicatively linked to the first platform control element 1102 via a first root segment 1103, while the second routing element 1106 is communicatively linked to the first platform control element 1102 via a second root segment 1104. The first routing element 1105 resides upon a second FRU 1107 and the second routing element 1106 resides upon a third FRU 1108.

The first routing element 1105 is communicatively linked to a first plurality of satellite management controllers 1111, 1112 via a first plurality of branch segments 1109*a-b*. The second routing element 1106 is communicatively linked to a second plurality of satellite management controllers 1113, 1114 via a second plurality of branch segments 110*a-b*. The satellite management controllers reside upon a plurality of FRUs. In this illustrative embodiment, the FRUs 1115, 1116, 1117, 1118 are all front boards. The number and type of FRUs may vary across platform management applications, and the number of satellite management controllers may vary across platform management applications.

As is evident from the above description, a wide variety of embodiments may be configured from the description given herein and additional advantages and modifications will readily occur to those skilled in the art after having read this disclosure. The invention in its broader aspects is therefore not intended to be limited to the specific details and illustrative examples shown and described. Accordingly, departures from such details may be made without departing from the spirit or scope of the applicant's general invention.

What is claimed is:

1. A platform management system for use in a modular electronic equipment platform with a star platform management bus including a backplane to which field replaceable units may be communicatively connected, comprising:
   a first field replaceable unit communicatively coupled to said backplane and including a first platform control element adapted to provide central management controller functions for the platform management system;
   a second field replaceable unit including a first routing element that is disaggregated from said first platform control element;
   a third field replaceable unit communicatively coupled to said backplane and including a second platform control element adapted to provide central management controller functions for the platform management system;
   a fourth field replaceable unit including a second routing element that is disaggregated from said second platform control element;
   a first root segment adapted to provide a communication link between said first platform control element and said first routing element;
   a second root segment adapted to provide a communication link between said second platform control element and said second routing element;
   a plurality of additional field replaceable units at least some of which include a satellite management controller;
   a first plurality of branch segments adapted to provide communication links between said first routing element and at least some of said field replaceable units; and
   a second plurality of branch segments adapted to provide communication links between said second routing element and at least some of said field replaceable units;
   wherein said first routing element and said second routing element are adapted to route communications between or among said first and second platform control elements and one or more of said field replaceable units.

2. A platform management system as recited in claim 1 wherein at least one of said first and second root segments provide communication links from one of said first and second platform control elements through said backplane to one of said first and second routing elements.

3. A platform management system as recited in claim 1 wherein at least some of said branch segments of said first and second pluralities of branch segments provide communication links from at least one of said first and second routing elements through said backplane to at least some of said plurality of said field replaceable units.

4. A platform management system as recited in claim 1 wherein at least one of said first and third field replaceable units includes a satellite management controller communicatively coupled to at least one of said first and second routing elements by at least one additional branch segment.

5. A platform management system as recited in claim 1 wherein one or more of said field replaceable units is a front board mounted in a subrack of said electronic platform.

6. A platform management system as recited in any of claims 1, 2, 3, 4, or 5 wherein said first platform control element and said second platform control element are adapted to provide redundant central management controller functions for a plurality of said field replaceable units within said electronic platform.

7. A platform management system as recited in claim 6 wherein at least some of said first branch segments are connected to an "A" port of said field replaceable units, and wherein at least some of said second branch segments are connected to a "B" port of said field replaceable units.

8. A platform management system as recited in claim 6 and further comprising:
 a fifth field replaceable unit including a third routing element that is disaggregated from said first platform control element;
 a third root segment adapted to provide a communications link between said first platform control element and said third routing element:
 a third plurality of branch segments linking said third routing element and at least some of said plurality of field replaceable units;
 a sixth field replaceable unit including a fourth routing element that is disaggregated from said second platform control element;
 a fourth root segment adapted to provide a communications link between said second platform control element and said fourth routing element: and
 a fourth plurality of branch segments linking said fourth routing element and at least some of said plurality of field replaceable units.

9. A platform management system as recited in claim 8 wherein said first and third pluralities of branch segments are connected to an "A" port on at least some of said field replaceable units, and wherein said second and fourth pluralities of branch segments are connected to a "B" port on at least some of said field replaceable units.

10. A platform management system as recited in claim 9 wherein at least one of said first, second, third and fourth routing elements is adapted to selectively route communications among said field replaceable units.

11. A platform management system as recited in claim 9 wherein any of said first, second, third and fourth pluralities of branch segments are each separately segregated into a plurality of logical branch buses.

12. A platform management system as recited in claim 7 and further comprising:
 a third root segment adapted to provide a communications link between said first platform control element and said second routing element; and
 a fourth root segment adapted to provide a communications link between said second platform control element and said first routing element.

13. A platform management system as recited in claim 6 wherein at least one of said first and second routing elements is adapted to selectively route communications among said field replaceable units.

14. A platform management system as recited in claim 6 wherein said first plurality of branch segments is segregated into a first plurality of logical branch buses, and wherein said second plurality of branch segments is segregated into a second plurality of logical branch buses.

15. A platform management system as recited in claim 12 wherein at least one of said first and second routing elements is adapted to selectively route communications among said field replaceable units.

16. A platform management system as recited in claim 12 wherein said first plurality of branch segments is segregated into a first plurality of logical branch buses, and wherein said second plurality of branch segments is segregated into a second plurality of logical branch buses.

17. A platform management system for use in a modular electronic equipment platform with a star platform management bus including a backplane to which field replaceable units may be communicatively connected, comprising:
 a first field replaceable unit communicatively coupled to said backplane and including a first platform control element for providing central management controller functions for the platform management system;
 a second field replaceable unit including a first routing element that is disaggregated from said first platform control element;
 a first root segment adapted to provide a communication link between said first platform control element and said first routing element;
 a plurality of additional field replaceable units at least some of which include a satellite management controller; and
 a first plurality of branch segments adapted to provide communication links between said first routing element and at least some of said field replaceable units;
 wherein said first routing element is adapted to route communications among or between said first platform control element and one or more of said field replaceable units.

18. A platform management system as recited in claim 17 and further comprising:
 a third field replaceable unit including a second routing element that is disaggregated from said first platform control element;
 a second root segment adapted to provide a communication link between said first platform control element and said second routing element; and
 a second plurality of branch segments adapted to provide alternative communication links between said second routing element and one or more of said field replaceable units.

19. A platform management system as recited in claim 18 wherein at least some of said field replaceable units include "A" and "B" ports;
 wherein said first plurality of branch segments is adapted to provide communications links between said first routing element and the "A" ports of said some of said field replaceable units; and
 wherein said second plurality of branch segments is adapted to provide communications links between said second routing element and the "B" ports of said some of said field replaceable units.

20. A platform management system as recited in claim 17 wherein at least some of said plurality of branch segments provides communication links from said first routing element through said backplane to some of said field replaceable units.

21. A platform management system as recited in claim 17 wherein said first root segment provides a communication link from said first platform control element through said backplane to said first routing element.

22. A platform management system as recited in one of claims 17, 20, or 21 wherein one or more of said field replaceable units is a front board mounted in a subrack of said platform.

23. A platform management system as recited in claim 17 wherein said first routing element is adapted to selectively route communications among said field replaceable units.

24. A platform management system as recited in claim 18 wherein at least one of said first and second routing elements is adapted to selectively route communications among said field replaceable units.

25. A platform management system as recited in claim 17 wherein said first plurality of branch segments is segregated into a first plurality of logical branch buses.

26. A platform management system as recited in claim 18 wherein at least one of said first and second pluralities of branch segments is separately segregated into a plurality of logical branch buses.

27. A platform management system as recited in claim 18 wherein at least some of said first and second pluralities of branch segments provide communication links from said first routing element through said backplane to said field replaceable units.

28. A platform management system as recited in claim 18 wherein at least one of said first and second root segments provides a communication link from said first platform control element through said backplane to one of said first and second routing elements.

29. A platform management system as recited in claim 17 and further comprising:
- a third field replaceable unit communicatively coupled to said backplane and including a second platform control element for providing central management controller functions for the platform management system;
- a fourth field replaceable unit including a second routing element that is disaggregated from said first and said second platform control elements;
- a second root segment adapted to provide a communication link between said second platform control element and said second routing element; and
- a second plurality of branch segments adapted to provide communication links between said second routing element and at least some of said field replaceable units;
- wherein said second routing element is adapted to route communications among or between said second platform control element and one or more of said field replaceable units.

30. A platform management system as recited in claim 29 wherein at least some of said first branch segments are connected to an "A" port of said field replaceable units, and wherein at least some of said second branch segments are connected to a "B" port of said field replaceable units and further comprising:
- a third root segment adapted to provide a communication link between said first platform control element and said second routing element; and
- a fourth root segment adapted to provide a communication link between said second platform control element and said first routing element, whereby said first platform control element and said second platform control element can be operated to provide central management controller functions on a redundant basis, or one of said control elements can be operated in an active mode while the other control element is operated in a standby mode.

* * * * *